(12) United States Patent
Shiraishi

(10) Patent No.: US 8,712,174 B2
(45) Date of Patent: Apr. 29, 2014

(54) IMAGE PROCESSING APPARATUS AND IMAGE PROCESSING METHOD

(75) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 299 days.

(21) Appl. No.: 13/311,799

(22) Filed: Dec. 6, 2011

(65) Prior Publication Data

US 2012/0155779 A1    Jun. 21, 2012

(30) Foreign Application Priority Data

Dec. 15, 2010   (JP) ................................ 2010-279057

(51) Int. Cl.
*G06K 9/36*    (2006.01)

(52) U.S. Cl.
USPC ....... 382/238; 382/233; 382/244; 375/240.12

(58) Field of Classification Search
USPC ..................... 382/233, 238, 244; 375/240.12
See application file for complete search history.

(56) References Cited

U.S. PATENT DOCUMENTS

| | | | |
|---|---|---|---|
| 6,233,358 B1 * | 5/2001 | Acharya | 382/248 |
| 6,563,956 B1 * | 5/2003 | Satoh et al. | 382/245 |
| 6,744,929 B1 * | 6/2004 | Okada | 382/251 |
| 6,915,017 B2 | 7/2005 | Shiraishi | |
| 6,941,023 B2 | 9/2005 | Shiraishi | |
| 7,079,691 B2 | 7/2006 | Shiraishi | |
| 7,233,702 B2 | 6/2007 | Shiraishi | |
| 7,359,557 B2 | 4/2008 | Shiraishi | |
| 7,456,985 B2 | 11/2008 | Shiraishi | |
| 7,483,586 B2 | 1/2009 | Shiraishi | |
| 7,573,614 B2 | 8/2009 | Shiraishi | |
| 2002/0075532 A1 | 6/2002 | Shiraishi | |
| 2003/0063813 A1 | 4/2003 | Shiraishi | |
| 2005/0151991 A1 | 7/2005 | Shiraishi | |
| 2005/0207667 A1 | 9/2005 | Shiraishi | |
| 2006/0072142 A1 | 4/2006 | Shiraishi | |
| 2006/0193528 A1 | 8/2006 | Shiraishi | |
| 2009/0060325 A1 | 3/2009 | Shiraishi | |
| 2009/0128857 A1 | 5/2009 | Shiraishi | |
| 2011/0228325 A1 | 9/2011 | Shiraishi | |
| 2011/0273736 A1 | 11/2011 | Shiraishi | |
| 2011/0280492 A1 | 11/2011 | Shiraishi | |

FOREIGN PATENT DOCUMENTS

JP          4000265 A     6/2007

OTHER PUBLICATIONS

Abstract of Japanese patent publication JP-2003264703, Sep. 19, 2003.

* cited by examiner

*Primary Examiner* — Chan Park
*Assistant Examiner* — Eueng-Nan Yeh
(74) *Attorney, Agent, or Firm* — Harness, Dickey & Pierce, P.L.C.

(57) ABSTRACT

In an image processing apparatus according to an embodiment, a first prediction value calculating unit calculates a prediction value of the pixel value; a prediction error calculating unit calculates a prediction error between the prediction value and the pixel value of the target pixel; a second storage unit receives the prediction error sequentially from a first terminal and stores therein; a comparing unit compares the prediction error with each of the prediction errors already stored; a search unit, when the prediction error thus received is identical to each of the prediction errors, searches for a data array; a length information generating unit generates length information; an address information generating unit generates address information; a first code data generating unit generates first code data; and a second code data generating unit generates second code data by encoding the pixel value of the target pixel.

4 Claims, 20 Drawing Sheets

PLANE PREDICTION VALUE
=a+b-c

FIG.8A

SLIDE SEARCH

SLIDE STORAGE UNIT: #15 a | #14 c | #13 a | #12 c | #11 b | #10 d | #9 c | #8 b | #7 a | #6 c | #5 b | #4 a | #3 a | #2 c | #1 b | #0 a ← INPUT DATA: a

R FLAG: RFLG15=1 | RFLG14=1 | RFLG13=0 | RFLG12=0 | RFLG11=1 | RFLG10=0 | RFLG9=0 | RFLG8=0 | RFLG7=0 | RFLG6=0 | RFLG5=1 | RFLG4=0 | RFLG3=0 | RFLG2=1 | RFLG1=1 | RFLG0=0 | ... =1

(R FLAG bits as shown: 1 0 1 0 0 0 0 0 1 0 0 1 1 0 0 1)

FIG.8B

LIST SEARCH

SLIDE STORAGE UNIT: #15 c | #14 a | #13 c | #12 b | #11 d | #10 c | #9 b | #8 a | #7 c | #6 b | #5 a | #4 a | #3 c | #2 b | #1 a | #0 a ← INPUT DATA: c

R FLAG bits: 1 0 1 0 0 0 0 0 1 0 0 1 1 0 0 1   Length: 0

W FLAG bits: 1 0 1 0 0 0 0 0 1 0 0 0 1 0 0 0

FIG.9C

LIST SEARCH

| | #15 | #14 | #13 | #12 | #11 | #10 | #9 | #8 | #7 | #6 | #5 | #4 | #3 | #2 | #1 | #0 | INPUT DATA |
|---|---|---|---|---|---|---|---|---|---|---|---|---|---|---|---|---|---|
| SLIDE STORAGE UNIT | a | c | b | d | c | b | a | c | b | a | a | c | b | a | a | c | ← b |

| | RFLG 15 | RFLG 14 | RFLG 13 | RFLG 12 | RFLG 11 | RFLG 10 | RFLG 9 | RFLG 8 | RFLG 7 | RFLG 6 | RFLG 5 | RFLG 4 | RFLG 3 | RFLG 2 | RFLG 1 | RFLG 0 | Length |
|---|---|---|---|---|---|---|---|---|---|---|---|---|---|---|---|---|---|
| R FLAG | 1 | 0 | 1 | 0 | 0 | 0 | 0 | 0 | 1 | 0 | 0 | 0 | 1 | 0 | 0 | 0 | 1 |

| | WFLG 15 | WFLG 14 | WFLG 13 | WFLG 12 | WFLG 11 | WFLG 10 | WFLG 9 | WFLG 8 | WFLG 7 | WFLG 6 | WFLG 5 | WFLG 4 | WFLG 3 | WFLG 2 | WFLG 1 | WFLG 0 |
|---|---|---|---|---|---|---|---|---|---|---|---|---|---|---|---|---|
| W FLAG | 0 | 0 | 1 | 0 | 0 | 0 | 0 | 0 | 1 | 0 | 0 | 1 | 1 | 0 | 0 | 0 |

FIG.9D

LIST SEARCH

| | #15 | #14 | #13 | #12 | #11 | #10 | #9 | #8 | #7 | #6 | #5 | #4 | #3 | #2 | #1 | #0 | INPUT DATA |
|---|---|---|---|---|---|---|---|---|---|---|---|---|---|---|---|---|---|
| SLIDE STORAGE UNIT | c | b | d | c | b | a | c | b | a | a | c | b | a | a | c | b | ← d |

| | RFLG 15 | RFLG 14 | RFLG 13 | RFLG 12 | RFLG 11 | RFLG 10 | RFLG 9 | RFLG 8 | RFLG 7 | RFLG 6 | RFLG 5 | RFLG 4 | RFLG 3 | RFLG 2 | RFLG 1 | RFLG 0 | Length |
|---|---|---|---|---|---|---|---|---|---|---|---|---|---|---|---|---|---|
| R FLAG | 0 | 0 | 1 | 0 | 0 | 0 | 0 | 0 | 1 | 0 | 0 | 0 | 1 | 0 | 0 | 0 | 2 |

| | WFLG 15 | WFLG 14 | WFLG 13 | WFLG 12 | WFLG 11 | WFLG 10 | WFLG 9 | WFLG 8 | WFLG 7 | WFLG 6 | WFLG 5 | WFLG 4 | WFLG 3 | WFLG 2 | WFLG 1 | WFLG 0 |
|---|---|---|---|---|---|---|---|---|---|---|---|---|---|---|---|---|
| W FLAG | 0 | 0 | 1 | 0 | 0 | 0 | 0 | 0 | 0 | 0 | 0 | 0 | 0 | 0 | 0 | 0 |

FIG.9E

LIST SEARCH

SLIDE STORAGE UNIT: #15 b | #14 d | #13 c | #12 b | #11 a | #10 c | #9 b | #8 a | #7 a | #6 c | #5 b | #4 a | #3 c | #2 c | #1 b | #0 d ← INPUT DATA a

R FLAG: RFLG15 0 | RFLG14 0 | RFLG13 0 | RFLG12 0 | RFLG11 1 | RFLG10 0 | RFLG9 0 | RFLG8 0 | RFLG7 0 | RFLG6 0 | RFLG5 0 | RFLG4 0 | RFLG3 0 | RFLG2 0 | RFLG1 0 | RFLG0 0    Length 3

W FLAG: WFLG15 0 | WFLG14 0 | WFLG13 0 | WFLG12 0 | WFLG11 0 | WFLG10 0 | WFLG9 0 | WFLG8 0 | WFLG7 0 | WFLG6 0 | WFLG5 0 | WFLG4 0 | WFLG3 0 | WFLG2 0 | WFLG1 0 | WFLG0 0

FIG.9F

SLIDE SEARCH

SLIDE STORAGE UNIT: #15 b | #14 d | #13 c | #12 b | #11 a | #10 c | #9 b | #8 a | #7 a | #6 c | #5 b | #4 a | #3 a | #2 c | #1 b | #0 d ← INPUT DATA a

R FLAG: RFLG15 0 | RFLG14 0 | RFLG13 0 | RFLG12 0 | RFLG11 1 | RFLG10 0 | RFLG9 0 | RFLG8 1 | RFLG7 1 | RFLG6 0 | RFLG5 0 | RFLG4 1 | RFLG3 1 | RFLG2 0 | RFLG1 0 | RFLG0 0

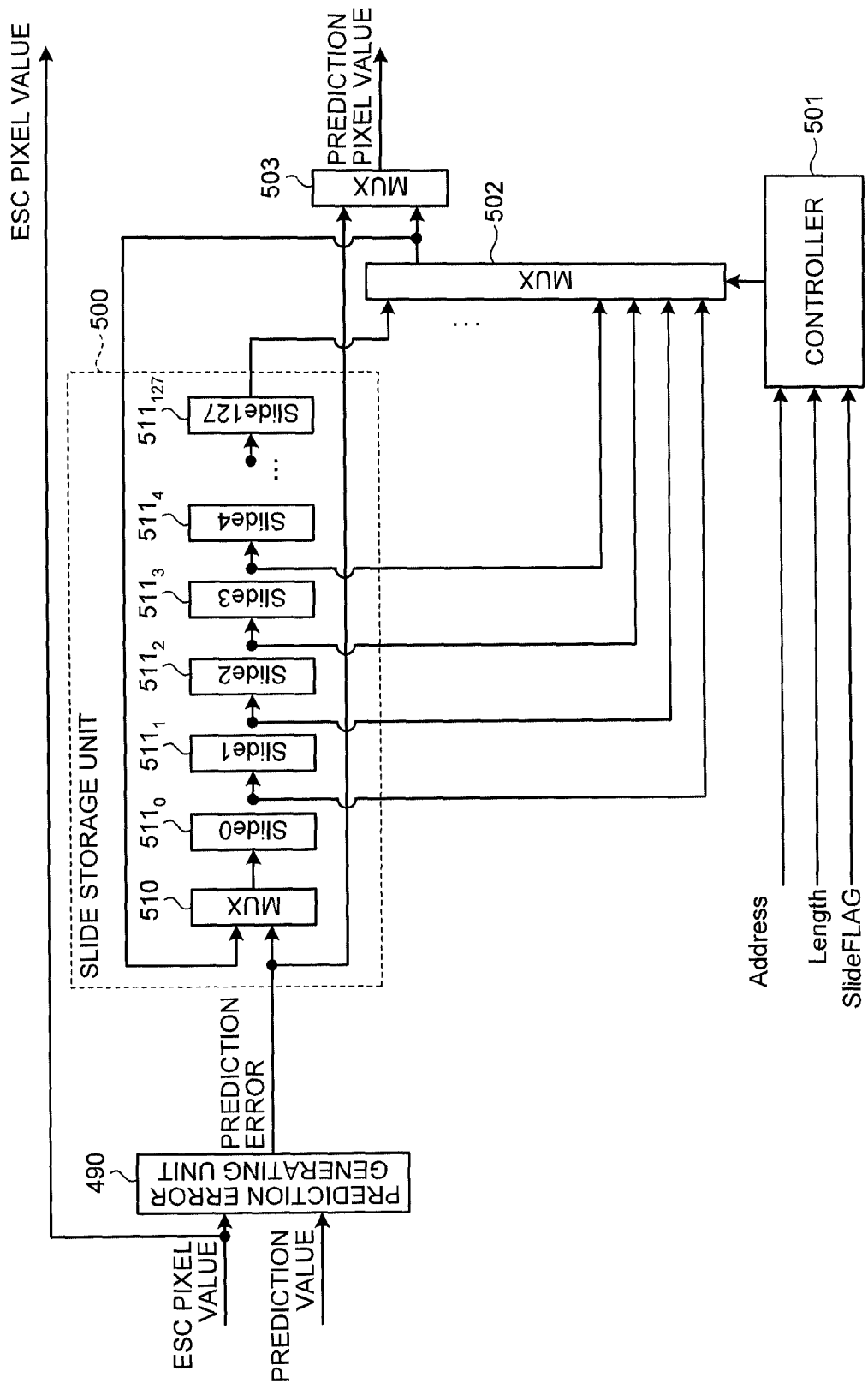

IMAGE PROCESSING APPARATUS AND IMAGE PROCESSING METHOD

CROSS-REFERENCE TO RELATED APPLICATIONS

The present application claims priority to and incorporates by reference the entire contents of Japanese Patent Application No. 2010-279057 filed in Japan on Dec. 15, 2010.

BACKGROUND OF THE INVENTION

1. Field of the Invention

The present invention relates to an image processing apparatus and an image processing method.

2. Description of the Related Art

Image forming apparatuses, such as a printer, temporarily store input image data in a memory, and read the image data stored in the memory at a predetermined timing to perform printing operations. In this case, if the image data is to be stored in the memory without any change, a large-capacity memory is required, thereby increasing the cost. Therefore, typically, input image data is stored in a memory in a manner compressed and encoded.

Japanese Patent No. 4000266, for example, discloses a technology for performing compression encoding by using the Lempel-Ziv (LZ) 77 algorithm. More specifically, in a slide storage unit that stores therein input data, a data array that is composed of previous consecutive image data and that is identical to an input data array composed of image data sequentially input is searched for, and the identical information thereof (position information, length, and the like) is to be encoded.

An assumption is made on the case where a prediction error value, which is difference between the pixel value of a pixel to be encoded (referred to as a "target pixel") and the prediction pixel value of the target pixel obtained from pixel values of surrounding pixels that surround the target pixel, is employed as input data. In this case, if the prediction error value thus input is identical to a prediction error value that has been already stored in the slide storage unit, list search processing is performed in the slide storage unit, and information of the list thus searched for is encoded. The list search processing is a processing for searching for a data array that is composed of previous consecutive prediction error values and that is identical to an input data array composed of prediction error values sequentially input. By contrast, if the prediction error thus input is not identical to the prediction error value that has been already stored in the slide storage unit, the prediction error value thus input is to be encoded.

The prediction error value is not always a positive value and can be a negative value. As a result, there is a problem in that the number of bits required for encoding the prediction error value is increased, whereby a sufficient compression ratio cannot be achieved.

SUMMARY OF THE INVENTION

It is an object of the present invention to at least partially solve the problems in the conventional technology.

An image processing apparatus includes: a first storage unit into which each pixel value of a plurality of pixels that constitute image data is written; a first reading unit that reads a pixel value of a target pixel to be encoded and a pixel value of a surrounding pixel of the target pixel from the first storage unit; a first prediction value calculating unit that calculates a prediction value of the pixel value of the target pixel based on the pixel value of the surrounding pixel read by the first reading unit; a prediction error calculating unit that calculates a prediction error that is difference between the prediction value calculated by the first prediction value calculating unit and the pixel value of the target pixel; a second storage unit that receives the prediction error calculated by the prediction error calculating unit sequentially from a first terminal and stores therein the prediction error thus received, and that transfers prediction errors already stored toward a second terminal and stores the prediction errors; a comparing unit that compares the prediction error received by the second storage unit with each of the prediction errors already stored in the second storage unit; a search unit that, when the prediction error thus received is identical to each of the prediction errors already stored in the second storage unit as a result of comparison made by the comparing unit, searches for a data array that is composed of the prediction error stored in the second storage unit consecutively and that is identical to an input data array composed of the prediction error received sequentially; a length information generating unit that generates length information indicating a length of the data array searched for by the search unit; an address information generating unit that generates address information indicating a position in the second storage unit at which start data of the data array searched for by the search unit is stored; a first code data generating unit that generates first code data obtained by encoding the length information generated by the length information generating unit and the address information generated by the address information generating unit; and a second code data generating unit that, when the prediction error thus received is identical to none of the prediction errors already stored in the second storage unit as a result of the comparison made by the comparing unit, generates second code data obtained by encoding the pixel value of the target pixel from which the prediction error thus received is calculated.

An image processing method includes: reading a pixel value of a target pixel to be encoded and a pixel value of a surrounding pixel of the target pixel from a first storage unit into which each pixel value of a plurality of pixels that constitute image data is written; first calculating that includes calculating a prediction value of the pixel value of the target pixel based on the pixel value of the surrounding pixel read at the reading; second calculating that includes calculating a prediction error that is a difference between the prediction value calculated at the first calculating of a prediction value and the pixel value of the target pixel; comparing the prediction error, which is received by a first terminal of a second storage unit that receives the prediction error calculated at the second calculating of a prediction error sequentially from the first terminal and stores therein the prediction error thus received, and that transfers prediction errors already stored toward a second terminal thereof and stores the prediction errors, with each of the prediction errors already stored in the second storage unit; searching for, when the prediction error thus received is identical to each of the prediction errors already stored in the second storage unit as a result of comparison at the comparing, a data array that is composed of the prediction error stored in the second storage unit consecutively, and that is identical to an input data array composed of the prediction error received sequentially; generating length information indicating the length of the data array searched for at the searching; generating address information indicating a position in the second storage unit at which start data of the data array searched for at the searching is stored; generating first code data obtained by encoding the length information generated at the generating of length information and the address information generated by the address information generating unit; and generating, when the prediction error thus received is identical to none of the prediction errors already stored in the second storage unit as a result of the comparison at the comparing, second code data obtained by encoding the pixel value of the target pixel in which the prediction error thus received is calculated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8A is a schematic for explaining flag processing in slide search processing and list search processing;

FIG. 8B is another schematic for explaining the flag processing in the slide search processing and the list search processing;

FIG. 9C is still another schematic for explaining the slide search processing and the list search processing when the flag processing is performed;

FIG. 9D is yet another schematic for explaining the slide search processing and the list search processing when the flag processing is performed;

FIG. 9E is yet another schematic for explaining the slide search processing and the list search processing when the flag processing is performed;

FIG. 9F is yet another schematic for explaining the slide search processing and the list search processing when the flag processing is performed;

FIG. 20 is a schematic of an exemplary hardware configuration of a slide extraction unit.

DETAILED DESCRIPTION OF THE PREFERRED EMBODIMENTS

Figure 1:
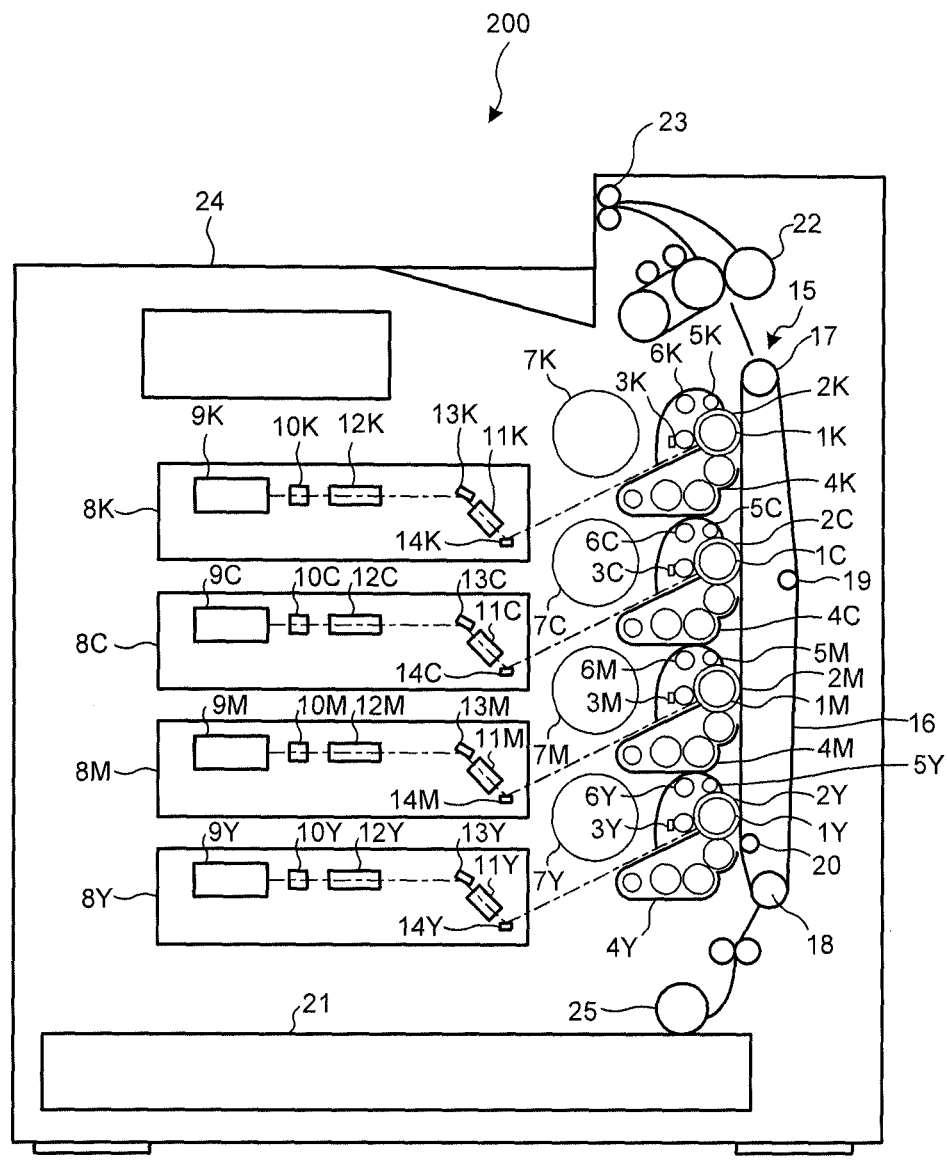
FIG. 1 is a schematic illustrating an exemplary configuration of a mechanical unit of an image forming apparatus to which an image processing apparatus according to an embodiment of the present invention is applicable.

Exemplary embodiments of an image processing apparatus will be described below in greater detail with reference to the accompanying drawings. FIG. 1 is an exemplary configuration of a mechanical unit of an image forming apparatus (which is assumed to be a color printer) to which the image processing apparatus according to an embodiment is applicable. In the present embodiment, an explanation will be made of an example in which the image processing apparatus and an image processing method according to the embodiment are applied to the image forming apparatus, which is a color printer. However, the embodiment is not limited thereto, and is applicable to any apparatus that performs image processing on an image including a character image. For example, the embodiment is also applicable to an image processing apparatus, such as a copying machine, a facsimile, and a multifunction product.

Example of a Printer Applicable to the Embodiment

A printer 200 illustrated in FIG. 1 is a four-drum tandem engine type image forming apparatus that forms images of four colors (yellow (Y), magenta (M), cyan (C), and black (K)) by separate image forming systems 1Y, 1M, 1C, and 1K, respectively, and synthesizes the images of four colors. Each of the image forming systems 1Y, 1M, 1C, and 1K includes a photosensitive element serving as an image carrier, such as organic photoconductor (OPC) drums 2Y, 2M, 2C, and 2K having small diameters. Arranged in a manner surrounding the OPC drums 2Y, 2M, 2C, and 2K from the upstream of image forming are: charging rollers 3Y, 3M, 3C, and 3K serving as charging units; developing devices 4Y, 4M, 4C, and 4K that develop electrostatic latent images on the OPC drums 2Y, 2M, 2C, and 2K with developer, respectively, to form a toner image of each of the colors Y, M, C, and K; cleaning devices 5Y, 5M, 5C, and 5K; neutralization apparatuses 6Y, 6M, 6C, and 6K, and the like.

Figure 2:
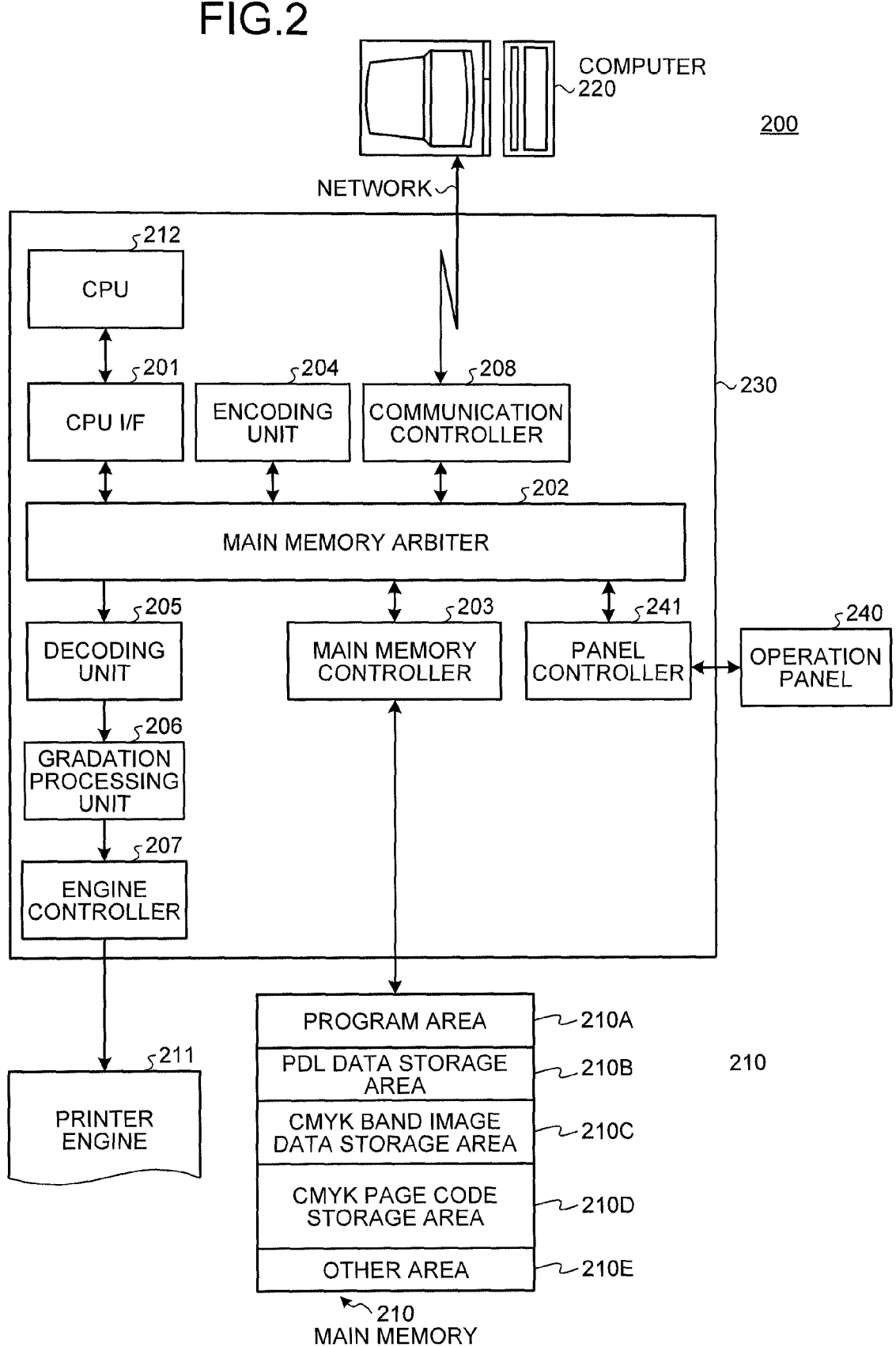
FIG. 2 is a block diagram of an exemplary configuration of an electrical/control device in the image forming apparatus.

FIG. 2 is a block diagram of an exemplary configuration of an electrical/control system of the printer 200 illustrated in FIG. 1. In the example illustrated in FIG. 2, the printer 200 includes a control unit 230, a main memory 210, a printer engine 211, and an operation panel 240. The control unit 230 includes a central processing unit (CPU) 212, a CPU interface (I/F) 201, a main memory arbiter 202, a main memory controller 203, an encoding unit 204, a decoding unit 205, a gradation processing unit 206, an engine controller 207, and a panel controller 241.

The CPU 212 controls the entire operation of the printer 200 in accordance with a computer program stored in the main memory 210. The CPU 212 is connected to the main memory arbiter 202 via the CPU I/F 201. The main memory arbiter 202 arbitrates access of the CPU 212, the encoding unit 204, the decoding unit 205, and a communication controller 208 to the main memory 210.

The main memory 210 is connected to the main memory arbiter 202 via the main memory controller 203. The main memory controller 203 controls access to the main memory 210.

The main memory 210 includes a program area 210A, a page description language (PDL) data storage area 210B, a cyan-magenta-yellow-black (CMYK) band image data storage area 210C, a CMYK page code storage area 210D, and other area 210E. The program area 210A stores therein a computer program for causing the CPU 212 to operate. The PDL data storage area 210B stores therein PDL data supplied from a computer 220 via the communication controller 208, for example. The CMYK band image data storage area 210C stores therein CMYK band image data. The CMYK page code storage area 210D stores therein code data obtained by compressing and encoding band image data. The CMYK page code storage area 210D stores therein code data obtained by compressing and encoding CMYK band image data of one page, for example. The other area 210E stores therein data other than the data described above.

The encoding unit 204 encodes band image data to be stored in the main memory 210. Code data obtained by encoding the band image data is supplied to the main memory 210 via the main memory arbiter 202 and the main memory controller 203, and is written in the CMYK page code storage area 210D. The decoding unit 205 reads the code data from the CMYK page code storage area 210D of the main memory 210, and decodes the code data in synchronization with the printer engine 211, which will be described later. The image data thus decoded is supplied to the gradation processing unit 206 to be treated with gradation processing, and is transferred to the engine controller 207.

The engine controller 207 controls the printer engine 211. In FIG. 1, the printer engine 211 of one plate alone among plates for the colors of CMYK is illustrated, and those of other plates are omitted to avoid complication.

The communication controller 208 controls communications performed via a network. PDL data output from the computer 220, for example, is received by the communication controller 208 via the network. The communication controller 208 transfers the PDL data thus received to the main memory 210 via the main memory arbiter 202 and the main memory controller 203.

The network may be a network used for communicating within a predetermined area such as a local area network (LAN), a network capable of communicating in a wider area such as the Internet, or the like. The network may be wired or wireless, or may be serial communication such as Universal Serial Bus (USB) and Institute Electrical and Electronics Engineers (IEEE) 1394.

The operation panel 240 includes a plurality of manipulandums for receiving a user operation and a display element for providing information to the user. The panel controller 241 not only controls display on the operation panel 240 in accordance with an instruction from the CPU 212, but also transmits a signal depending on the user operation performed on the operation panel 240 to the CPU 212.

Outline of the Encoding Processing

Figure 3:
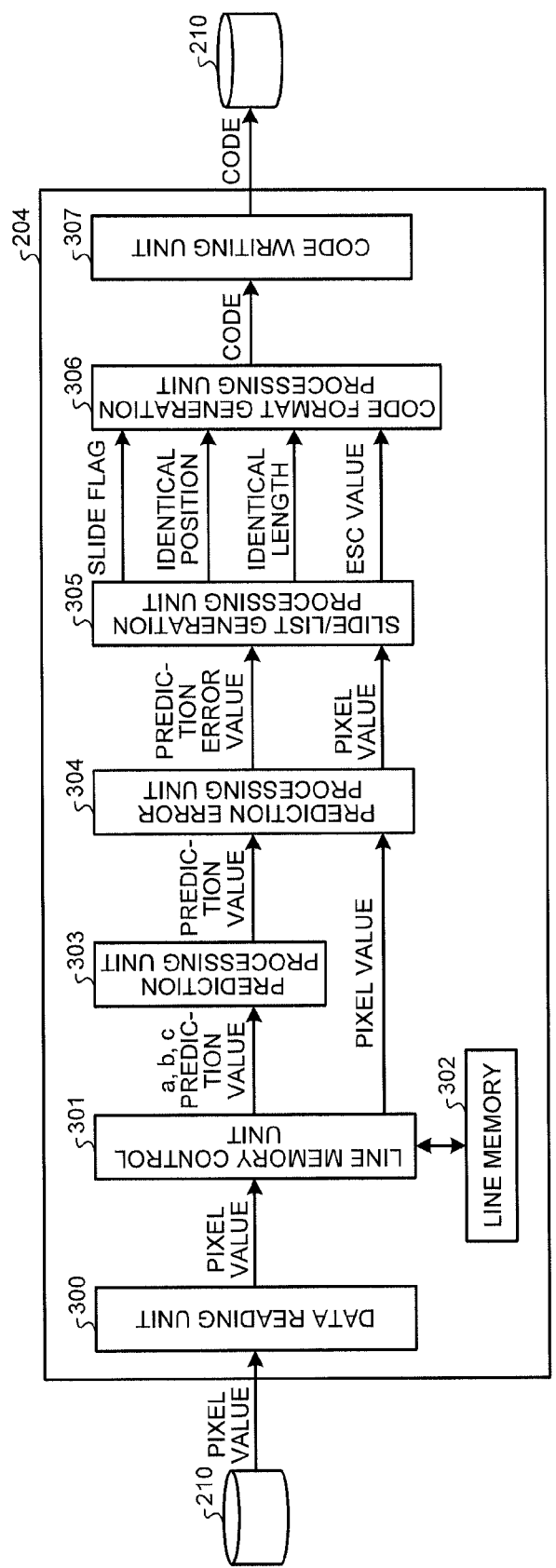
FIG. 3 is a schematic of an exemplary configuration of an encoding unit.

FIG. 3 is a schematic of an exemplary configuration of the encoding unit 204 according to the present embodiment. The encoding unit 204 includes a data reading unit 300, a line memory control unit 301, a line memory 302, a prediction processing unit 303, a prediction error processing unit 304, a slide/list generation processing unit 305, a code format generation processing unit 306, and a code writing unit 307.

The data reading unit 300 reads the CMYK band image data of each CMYK plate from the CMYK band image data storage area 210C of the main memory 210. At this time, the CMYK band image data (multi-valued image data) of each CMYK plate is read from the CMYK band image data storage area 210C sequentially for each scan line in pixel units by the data reading unit 300.

The line memory control unit 301 stores the image data (pixel value) read in pixel units by the data reading unit 300 in the line memory 302. In the present embodiment, the line memory 302 can store therein pixel values for two lines. The line memory 302 is controlled by the line memory control unit 301 so as to retain pixel values for one line stored just previously as well as to store the pixel value supplied this time.

More specifically, the line memory 302 can store pixel values for one line, and includes a first area to which a pixel to be encoded (hereinafter, referred to as an "target pixel") is written sequentially and a second area that stores therein pixel values of a line that is a line immediately before a line including the target pixel, and for which encoding is already finished.

Figure 4:
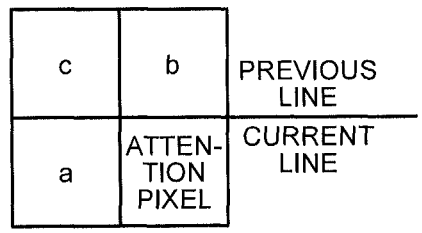
FIG. 4 is a schematic for explaining pixels surrounding a target pixel.

By control performed by the line memory control unit 301, the pixel value of the target pixel and pixel values of three surrounding pixels of the target pixel are read sequentially from the line memory 302, and are transferred to the prediction processing unit 303. The three surrounding pixels read from the line memory 302 at this time are pixels that are adjacent to the target pixel, and for which encoding is already finished. More specifically, as illustrated in FIG. 4, the three surrounding pixels are a pixel a immediately before the target pixel in a scanning order, a pixel b positioned directly above the target pixel in a previous line immediately before a current line including the target pixel in the scanning order, that is, directly above the target pixel in the line directly above the line including the target pixel, and a pixel c immediately before the pixel b in the scanning order. It is to be noted that a line including the target pixel to be encoded is hereinafter referred to as a current line, and a line immediately before the current line in the scanning order is hereinafter referred to as a previous line.

Figure 5:
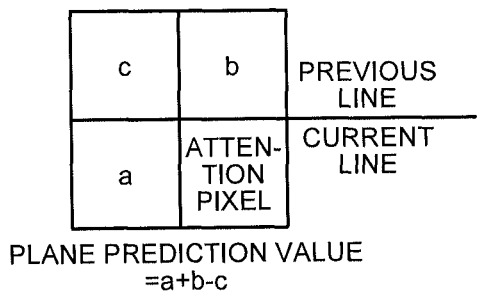
FIG. 5 is a schematic for explaining a method for performing calculation in prediction processing.

The prediction processing unit 303 predicts the pixel value of the target pixel based on the pixel a, the pixel b, and the pixel c transferred from the line memory control unit 301. In the present embodiment, the prediction processing unit 303 predicts the pixel value of the target pixel by using the plane prediction method. In the plane prediction method, as illustrated in FIG. 5, Equation (1) is calculated by using the pixel a encoded immediately before the target pixel in the current line, and the pixel b and the pixel c positioned directly above the target pixel and the pixel a, respectively, in the previous line, whereby a prediction value for the target pixel is obtained.

$$\text{Prediction Value} = a + b - c \qquad (1)$$

If the target pixel is a leading pixel of the line in the scanning order, and if the current line is a leading line in the scanning order, the plane prediction value is assumed to be 0.

Referring back to FIG. 3, the explanation will be continued. The prediction error processing unit 304 calculates a prediction error value that is difference between the pixel vale of the target pixel and the plane prediction value calculated by the prediction processing unit 303, and outputs the prediction error value thus calculated and the pixel value of the target pixel to the slide/list generation processing unit 305 at the subsequent stage.

The slide/list generation processing unit 305 includes a slide storage unit of the First-In First-Out (FIFO) method that stores therein prediction error values sequentially input from the prediction error processing unit 304. The slide/list generation processing unit 305 compares the prediction error value thus supplied with each previous prediction error value stored in the slide storage unit. If the prediction error value thus supplied is identical to the previous prediction error value, the slide/list generation processing unit 305 performs list search processing for searching for a data array (referred to as a "list") that is identical to an input data array composed of prediction error values input sequentially, and that is composed of prediction errors already stored in the slide storage unit consecutively. The slide/list generation processing unit 305 then generates length information Length indicating the length of the list obtained from a result of the list search processing and address information Address indicating the position in the slide storage unit at which start data of the list obtained from the result of the list search processing is stored when the comparison described above is made, and outputs the length information Length and the address information Address to the code format generation processing unit 306 at the subsequent stage.

By contrast, as a result of the comparison described above, if the prediction error value thus supplied is identical to none of the previous prediction error values in the slide storage unit, the slide/list generation processing unit 305 outputs the pixel value of the target pixel itself in which the prediction error value thus input is calculated to the code format generation processing unit 306 at the subsequent stage as ESC data. Furthermore, the slide/list generation processing unit 305 outputs a comparison result flag SlideFLAG indicating the comparison result described above to the code format generation processing unit 306 at the subsequent stage. If the comparison result described above is positive, the comparison result flag SlideFLAG is set to "1", whereas if the comparison result described above is negative, the comparison result flag SlideFLAG is set to "0".

Figure 6:
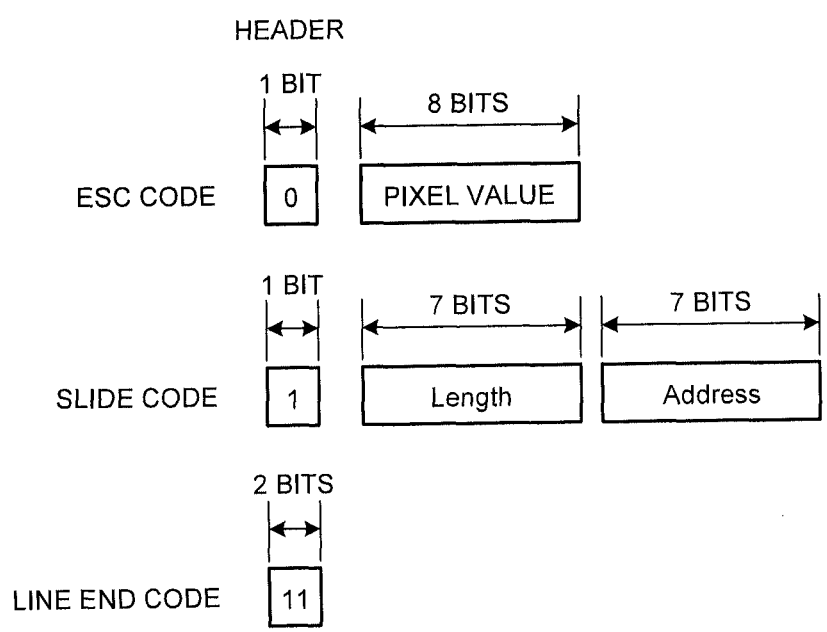
FIG. 6 is a schematic of an example of an encoding format.

The code format generation processing unit 306 generates an ESC code, a Slide code, and a line end code in such a format illustrated in FIG. 6 from the ESC data, the address information Address, the length information Length, and the comparison result flag SlideFLAG thus supplied.

The ESC code is a code obtained by encoding the ESC data. As illustrated in FIG. 6, in the ESC code, a flag SlideFLAG of a value "0" whose data length is one bit serves as a header, and a pixel value whose data length is eight bits are connected thereto. In the Slide code, a comparison result flag SlideFLAG of a value "1" whose data length is one bit serves as a header, and length information Length and address information Address each of which data length is seven bits are connected thereto sequentially. The line end code is a code indicating a line end, and is composed of data of a value "11" whose data length is two bits. It is to be noted that the code format illustrated in FIG. 6 is just an example, and the code format is not limited thereto.

The ESC code, the Slide code, and the line end code generated by the code format generation processing unit 306 is supplied to the code writing unit 307. The code writing unit 307 writes the ESC code, the Slide code, and the line end code thus supplied into the CMYK page code storage area 210D of the main memory 210 via the main memory arbiter 202 and the main memory controller 203.

An explanation will be made of specific contents of the encoding processing performed by the encoding unit 204 according to the present embodiment. In the present embodiment, the encoding unit 204 repeats the slide search processing and the list search processing, thereby encoding data. In the slide search processing, previous data (prediction error value) that is identical to input data (prediction error value) of one unit (e.g., one byte), and that is stored in the slide storage unit is searched for. If no data identical to the input data is found in the previous data in the slide storage unit, the encoding unit 204 uses the input data itself as ESC data, and encodes the input data.

In the slide search processing, if previous input data in the slide storage unit that is identical to the prediction error value thus input is found, the identical previous data is used as a route to perform the list search processing described above. The position of the previous data serving as the route of the list searched for in the list searching processing in the slide storage unit is output as the address information Address, and the length of the list is output as the length information Length. Subsequently, these pieces of information are encoded.

The encoding processing will be described more specifically with reference to FIG. 7. In the present embodiment, the slide storage unit includes 128 registers connected in series, and is configured as a FIFO. In the example illustrated in FIG. 7, an explanation will be made by using 16 registers of #0 to #15 connected in series. Each register is assumed to be capable of storing therein data of one unit (e.g., one byte). The register included in the slide storage unit is hereinafter referred to as a slide.

Figure 7:
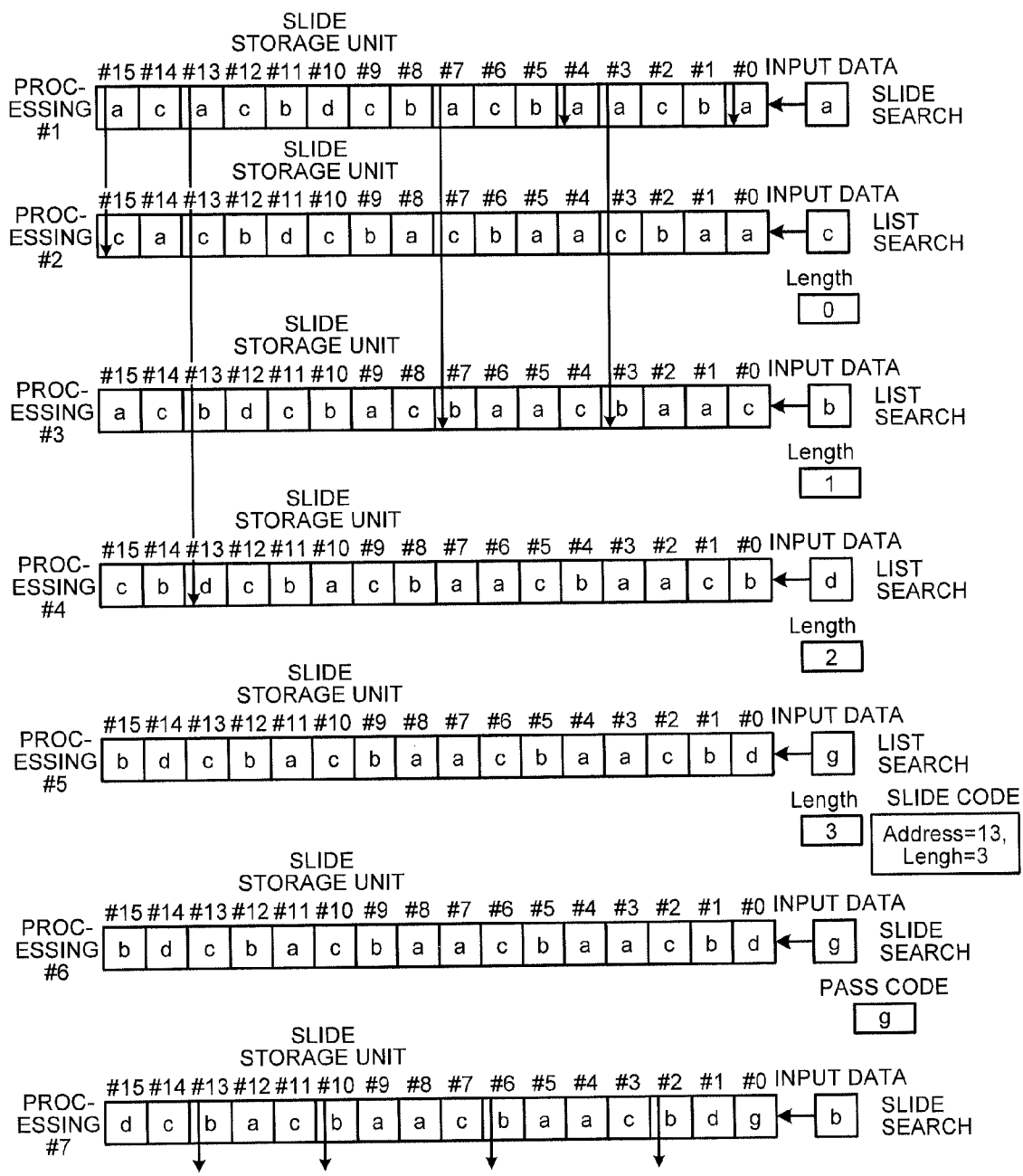
FIG. 7 is a schematic for explaining encoding processing of the present embodiment.

In processing #1, an assumption is made that 16 pieces of previous input data (prediction error values) have been already stored in the slides in the slide storage unit, such as "a, b, c, a, a, b, c, a, b, c, d, b, c, a, c, a", in order of being newly input, that is, from right to left in FIG. 7. First, input data (prediction error value) "a" is input to the slide/list generation processing unit 305. By the slide searching processing, the input data "a" is compared with each of the previous data (prediction error value) stored in each of the slides, and data identical to the input data is searched for. In the example illustrated in FIG. 7, it is found that data stored in the slides of #0, #3, #4, #7, #13, and #15 is identical to the input data. Therefore, the data stored in the slides of these numbers serve as a route in the list search processing.

The data identical to the input data "a" is found from the previous data stored in each of the slides by the slide search processing. As a result, the list search processing of processing #2 is performed.

In the processing #2, the previous data stored in the slides is shifted to left by one, and the input data "a" input in the processing #1 is added to the slide of #0 in the slide storage unit. At the same time, next input data "c" is input to the slide/list generation processing unit 305. In the list search processing, among the slides, data identical to the newly input data "c" is searched for from the slides (#0, #3, #4, #7, #13, and #15) in which the data identical to the input data is stored in the processing #1 just prior to the processing #2.

In the example illustrated in FIG. 7, the previous data stored in the slides of #0 and #4, the previous data being identical to the input data in the processing #1, is not identical to the input data in the processing #2. By contrast, in the processing #2, the previous data stored in the slides of #3, #7, #13 and #15 is data "c", and is identical to the newly input data "c".

The data identical to the input data "c" input in the processing #2 is found from the slides (#0, #3, #4, #7, #13, and #15) in which the data identical to the input data is stored in the processing #1 just prior thereto by the list search processing of the processing #2. As a result, the next processing is the list search processing. Because the processing #2 is the starting point of the list search processing, length Length indicating the length of the list is set to "0".

In processing #3, similarly to the processing #2 described above, the previous data stored in the slides is shifted to left by one, and the input data "c" input in the processing #2 is added to the slide of #0 in the slide storage unit. At the same time, next input data "b" is input to the slide/list generation processing unit 305. Subsequently, among the slides, data identical to the newly input data "b" is searched for from the slides (#3, #7, #13, and #15) in which the previous data identical to the input data is stored in the processing #1 and the processing #2 just prior to the processing #3.

In the example illustrated in FIG. 7, the previous data stored in the slide of #15 is not identical to the input data in the processing #3. By contrast, in the processing #3, the previous data stored in the slides of #3, #7, and #13 is "b", and is identical to the newly input data "b". In next processing #4, the previous data stored in the slides of #3, #7, and #13 is to be targets of the list search. In other words, at the stage of the processing #3, a list related to #3, #7, and #13 is left. In the processing #3, the length of the list is "1", and the value of the length Length information is set to "1".

By repeating such processing, a data array whose list is the longest is obtained. In the example illustrated in FIG. 7, in processing #5, the previous data "c" stored in the slide of #13 on which the list search is performed in the processing #4 just prior to the processing #5 is not identical to newly input data "g", and the list is interrupted. Therefore, in the processing #5, one is selected from the list left in the processing #4 prior to the processing #5. The position in the slide storage unit in which the start data of the list is stored in the slide search processing (processing #1 in the example of FIG. 7) just prior to the list search processing is determined to be the address information Address, and the length of the list is determined to be the length information Length. The pieces of information are then encoded into a Slide code. In the example illustrated in FIG. 7, the value of the address information Address is "13", and the value of the length information length is "3".

Furthermore, in the processing #5, the slide search processing is performed on the input data "g". In the example, because the data "g" is not stored in each of the slides as previous data, it is determined that no data is identical to the input data. In this case, the process goes to processing #6, and the input data is used as ESC data without any change, and is encoded into an ESC code.

After the encoding into the ESC code is performed, the previous data stored in the slides is shifted to left by one, and the input data "g" input in the list search processing just prior thereto (the processing #5) is added to the slide of #0 in the slide storage unit in processing #7. Subsequently, the slide search processing is performed on next input data "b".

At this time, the slide storage unit can shift the data stored in each of the slides by the FIFO method. Therefore, it is possible to move to processing of next input data while maintaining the list that stores therein identity with the input data without any change.

In the example illustrated in FIG. 7, for example, the input data is identical to the previous data stored in the slides of #0, #3, #4, #7, #13, and #15 in the processing #1. Shifting the data stored in the slides sequentially in association with input of new data causes next data to be stored in the slides of #0, #3, #4, #7, #13, and #15 in the processing #2, for example. Therefore, in the slide storage unit, by comparing the data stored in the slides of the numbers in which identity is found in the slide search processing with input data in each list search processing, it is possible to search for a data array of previous data that is identical to a data array of input data.

As described above, employing the FIFO type memory for the slide storage unit facilitates performing the list search processing.

Flag Processing

The slide search processing and the list search processing described above are controlled by flags. The flag processing in the slide search processing and the list search processing will be described with reference to FIG. 8A and FIG. 8B.

FIG. 8A illustrates an R flag RFLGm indicating a result of the slide search processing. As illustrated in FIG. 8A, if input data "a" is input in a state where the previous data is stored in the slides in the slide storage unit, such as "a, b, c, a, a, b, c, a, b, c, d, b, c, a, c, a", from right to left in FIG. 8A, the previous data stored in the slides of #0, #3, #4, #7, #13, and #15 is identical to the input data. Therefore, R flags of RFLG0, RFLG3, RFLG4, RFLG7, RFLG13, and RFLG15 corresponding to the slides of these numbers are set to "1" indicating the fact that these pieces of data are identical to the input data.

As described above, if previous data stored in each of the slides is identical to input data, the list search processing is performed without performing the encoding processing. At this time, the position of the R flag RFLGm with respect to each of the slides is fixed. If there is no previous data stored in each of the slides that is identical to the input data, the input data is used as ESC data without any change, and is encoded into an ESC code. Subsequently, the slide search processing is performed on next input data.

FIG. 8B illustrates an example of a W flag WFLGm indicating a result of the list search processing. In the list search processing, data identical to newly input data is search for from data stored in the slides whose R flag RFLGm is set to "1" among the slides. If data identical to the input data is found, the value of the W flag WFLGm corresponding to the slide is set to "1" indicating the fact that the data is identical to the input data.

In the example illustrated in FIG. 8B, the list search processing is performed on the data stored in the slides of #0, #3, #4, #7, #13, and #15 whose R flag RFLGm is "1" among the previous data stored in the slides. Among these pieces of data, the data stored in the slides of #3, #7, #13, and #15 is identical to input data "c". Therefore, the values of W flags of WFLG3, WFLG7, WFLG13, and WFLG15 corresponding to these slides are set to "1" indicating the fact that these pieces of data are identical to the input data. It is indicated that, among the previous input data stored in the slides, the previous data identical to the input data input just previously and the previous input data identical to the current input data are consecutively stored in the slide whose value of the W flag WFLGm is set to "1".

Subsequently, the W flag WFLGm whose value is "1" is searched for. If the W flag WFLGm whose value is "1" is present, each of the W flag WFLGm is determined to be a new R flag RFLGm, and the list search processing is performed on next input data in the same manner as described above.

By contrast, if no W flag WFLGm whose value is "1" is present as a result of the search, it is indicated that the list is interrupted. In this case, one R flag RFLGm whose value is "1" is selected, and the address information Address of the slide corresponding to the R flag RFLGm thus selected and the length information Length at that time is encoded into a Slide code.

The slide search processing and the list search processing in the case where the R flag RFLGm and the W flag WFLGm are used will now be described with reference to FIG. 9A to FIG. 9H. In the example illustrated in FIG. 9A to FIG. 9H, similarly to FIG. 7, an explanation will be made by using 16 registers of #0 to #15 connected in series. An assumption is made that 16 pieces of data (prediction error values) input previously have been already stored in the slides, such as "a, b, c, a, a, b, c, a, b, c, d, b, c, a, c, a", in order of being newly input, that is, in ascending order of the numbers.

Figure 9A:
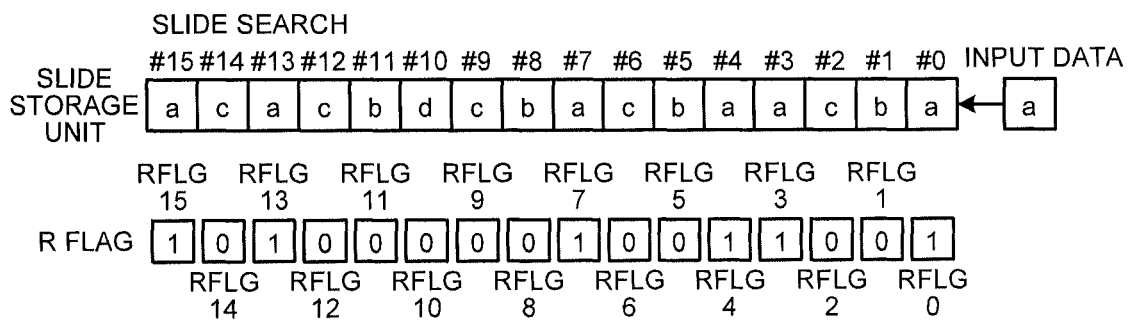
FIG. 9A is a schematic for explaining the slide search processing and the list search processing when the flag processing is performed.

In the present embodiment, the slide search processing and the list search processing are repeated to perform encoding. First, input data "a" is input, and the slide search processing is performed (FIG. 9A). Data identical to the input data "a" is searched for from the slides in the slide storage unit. If no data identical to the input data is found from the slides, the input data is used as ESC data without any change, and is encoded into an ESC code.

If a slide that stores therein data identical to the input data is found, the value of the R flag RFLGm corresponding to the slide is set to "1", and the values of other R flag RFLGm are set to "0". In the example illustrated in FIG. 9A, the data stored in the slides of #0, #3, #4, #7, #13, and #15 is identical to the input data. In the slide search processing, the data identical to the input data is used as a route to generate a list in the list search processing subsequent thereto.

The stored contents in the slides are then shifted to left one by one, and the input data "a" input just previously is added to the slide of #0. If the slides that store therein the data identical to the input data are found in the slide search processing in this manner, the process goes to the list search processing (FIG. 9B) without performing the encoding processing, and the length information Length is set to "0". Furthermore, the values of the R flag RFLGm (R flags of RFLG0, RFLG3, RFLG4, RFLG7, RFLG13, and RFLG15) corresponding to the slides (slides of #0, #3, #4, #7, #13, and #15), respectively, that store therein the data identical to the input data are set to "1", and the values of other R flag RFLGm are set to "0".

Figure 9B:
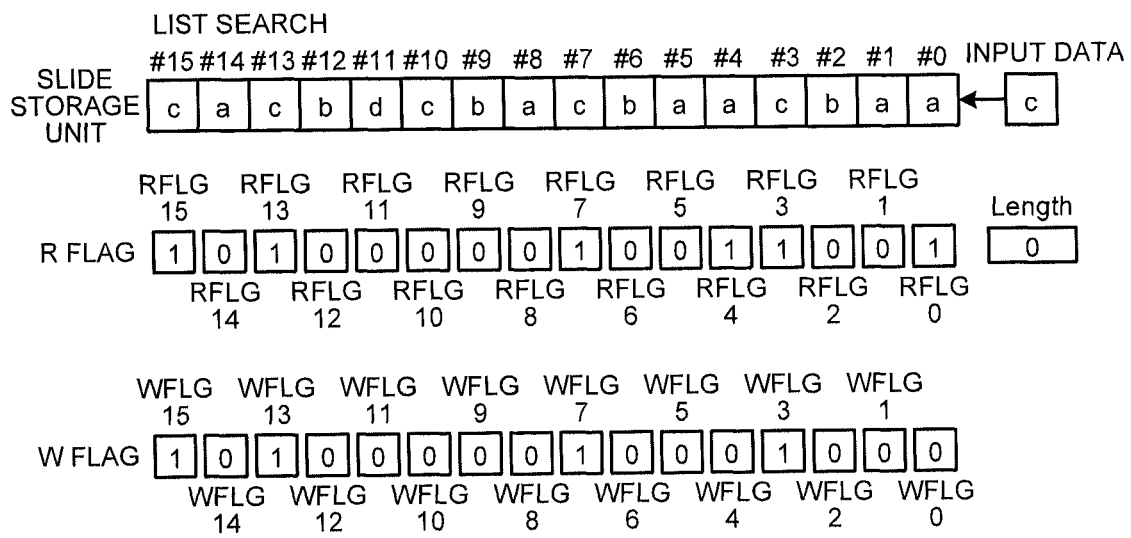
FIG. 9B is another schematic for explaining the slide search processing and the list search processing when the flag processing is performed.

Subsequently, as illustrated in FIG. 9B, input data "c" is input. In the list search processing, a slide that stores therein data identical to the input data "c" is search for among the slides whose value of the R flag RFLGm corresponding thereto is "1". In the example illustrated in FIG. 9B, among the slides whose value of the R flag RFLGm is set to "1", the data stored in the slides of #3, #7, #13, and #15 is identical to the input data. By contrast, the slides of #0 and #4 are left behind. Therefore, as illustrated in FIG. 9B, the values of the W flag WFLGm (W flags of WFLG3, WFLG7, WFLG13, and WFLG15) corresponding to the slides that store therein the data identical to the input data are set to "1", and the values of other W flag WFLGm are set to "0".

The stored contents in the slides are then shifted to left one by one, and the input data "c" input just previously is added to the slide of #0. In this case as well, the process goes to next list search processing (FIG. 9C) without performing the encoding processing, and the length information Length is set to "1". As illustrated in FIG. 9C, the value of the W flag WFLGm just prior to the processing (the value of the W flag WFLGm in FIG. 9B) is set to the R flag RFLGm, thereby updating the R flag RFLGm.

Subsequently, as illustrated in FIG. 9C, input data "b" is input. In the list search processing, a slide that stores therein data identical to the input data "b" is search for among the slides whose value of the R flag RFLGm corresponding thereto is set to "1". In the example illustrated in FIG. 9C, among the slides whose value of the R flag RFLGm is "1", the data stored in the slides of #3, #7, and #13 is identical to the input data. By contrast, the slide of #15 is left behind. Therefore, as illustrated in FIG. 9C, the values of the W flag WFLGm (W flags of WFLG3, WFLG7, and WFLG13) cor-responding to the slides that store therein the data identical to the input data are set to "1", and the values of other W flag WFLGm are set to "0".

The stored contents in the slides are then shifted to left one by one, and the input data "b" input just previously is added to the slide of #0. In this case as well, the process goes to next list search processing (FIG. 9D) without performing the encoding processing, and the length information Length is set to "2". As illustrated in FIG. 9D, the value of the W flag WFLGm just prior to the processing (the value of the W flag WFLGm in FIG. 9C) is set to the R flag RFLGm, thereby updating the R flag RFLGm.

Subsequently, as illustrated in FIG. 9D, input data "d" is input. In the list search processing, a slide that stores therein data identical to the input data "d" is search for among the slides whose value of the R flag RFLGm corresponding thereto is "1". In the example illustrated in FIG. 9D, the data stored in the slide of #13 is identical to the input data. By contrast, the slides of #3 and #7 are left behind. The value of the W flag WFLG13 corresponding to the slide the stores therein the data identical to the input data is set to "1".

The stored contents in the slides are then shifted to left one by one, and the input data "d" input just previously is added to the slide of #0. In this case as well, the process goes to next list search processing (FIG. 9E), without performing the encoding processing, and the length information Length is set to "3". As illustrated in FIG. 9E, the value of the W flag WFLGm just prior to the processing (the value of the W flag WFLGm in FIG. 9D) is set to the R flag RFLGm, thereby updating the R flag RFLGm.

Subsequently, as illustrated in FIG. 9E, input data "a" is input. In the list search processing, a slide that stores therein data identical to the input data "a" is search for among the slides whose value of the R flag RFLGm corresponding thereto is "1". In the example illustrated in FIG. 9E, the slide of #13 is left behind, and there is no slide that stores therein data identical to the input data "a". In other words, no list to be continued is present. Therefore, the position of the slide whose value of the R flag RFLG m is "1" in the slide storage unit (position of #13 in the example of FIG. 9E) is determined to be the address information Address, and the length information Length is set to "3". The pieces of information are then encoded into a Slide code as illustrated in FIG. 6. All the values of the W flag WFLG are set to "0", and the process goes to the slide search processing (FIG. 9F).

The slide search processing after the list is interrupted is performed on the input data "a" input in the list search processing just prior thereto (FIG. 9F). Data identical to the input data "a" is searched for from the slides in the slide storage unit. If no data identical to the input data is found from the slides, the input data is used as ESC data without any change, and is encoded into an ESC code.

If a slide that stores therein data identical to the input data is found, the value of the R flag RFLGm corresponding to the slide is set to "1". In the example illustrated in FIG. 9F, the data stored in the slides of #3, #4, #7, #8, and #11 is identical to the input data. In the slide search processing, the data identical to the input data is used as a route to generate a list in the list search processing subsequent thereto.

The stored contents in the slides are then shifted to left one by one, and the input data "a" is added to the slide of #0. If the slides that store therein the data identical to the input data are found in the slide search processing in this manner, the process goes to the list search processing (FIG. 9G) without performing the encoding processing, and the length information Length is set to "0". Furthermore, the values of the R flag RFLGm (R flags of RFLG3, RFLG4, RFLG7, RFLG8, and RFLG13) corresponding to the slides (slides of #3, #4, #7, #8, and #11), respectively, that store therein the data identical to the input data are set to "1", and the values of other R flag RFLGm are set to "0".

Figure 9G:
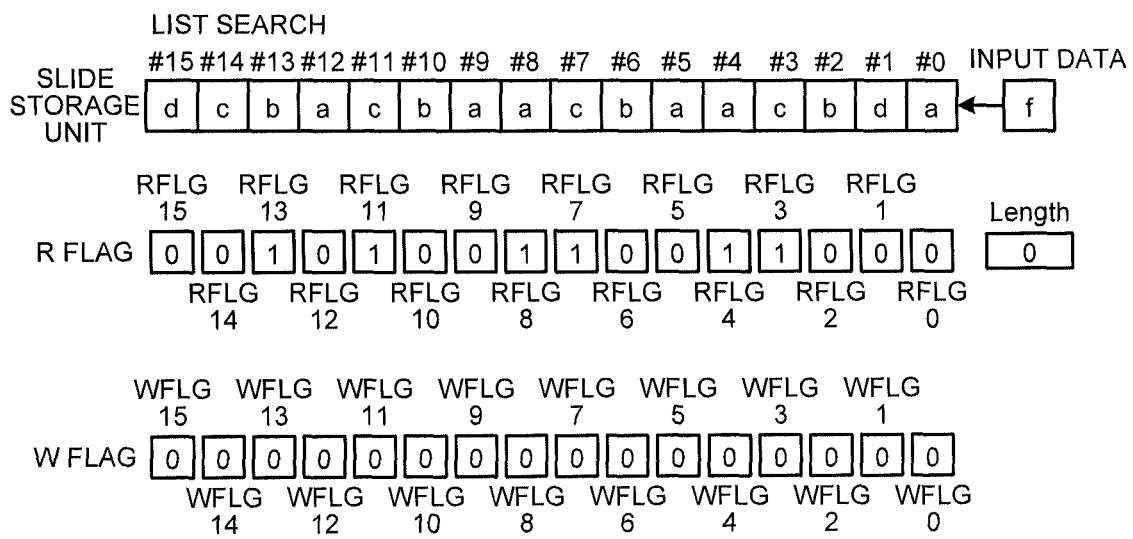
FIG. 9G is yet another schematic for explaining the slide search processing and the list search processing when the flag processing is performed.

Subsequently, as illustrated in FIG. 9G, input data "f" is input. In the list search processing, a slide that stores therein data identical to the input data "f" is search for among the slides whose value of the R flag RFLGm corresponding thereto is set to "1". In the example illustrated in FIG. 9F, there is no slide that stores therein data identical to the input data "f". As a result, all the values of the W flag WFLGm are set to "0", and the process goes to the slide search processing (FIG. 9H).

Figure 9H:
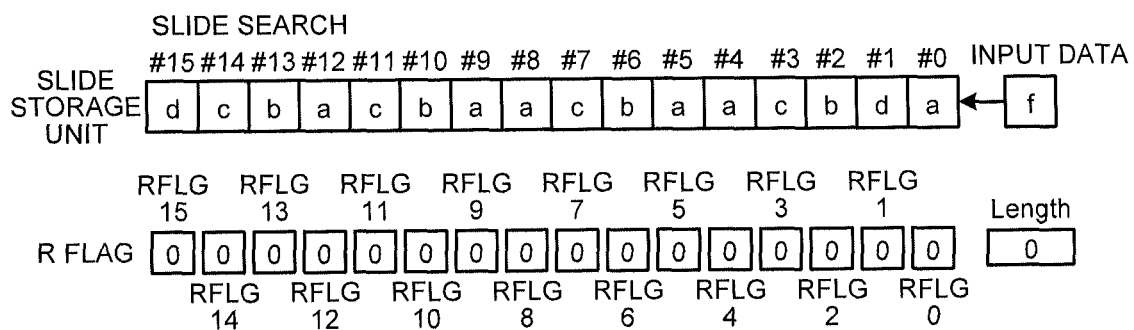
FIG. 9H is yet another schematic for explaining the slide search processing and the list search processing when the flag processing is performed.

The slide search processing at this time is performed on the input data "f" in the list search processing just prior thereto (FIG. 9H). Data identical to the input data "f" is searched for from the slides in the slide storage unit. In the example illustrated in FIG. 9H, because no data identical to the input data is found from the slides, the input data is used as ESC data without any change, and is encoded into an ESC code. Furthermore, all the values of the R flag RFLGm are set to "0".

The stored contents in the slides are then shifted to left one by one, and the input data "f" is added to the slide of #0. Subsequently, the process goes to encoding of the next input data.

Details of the Encoding Processing

Figure 10:
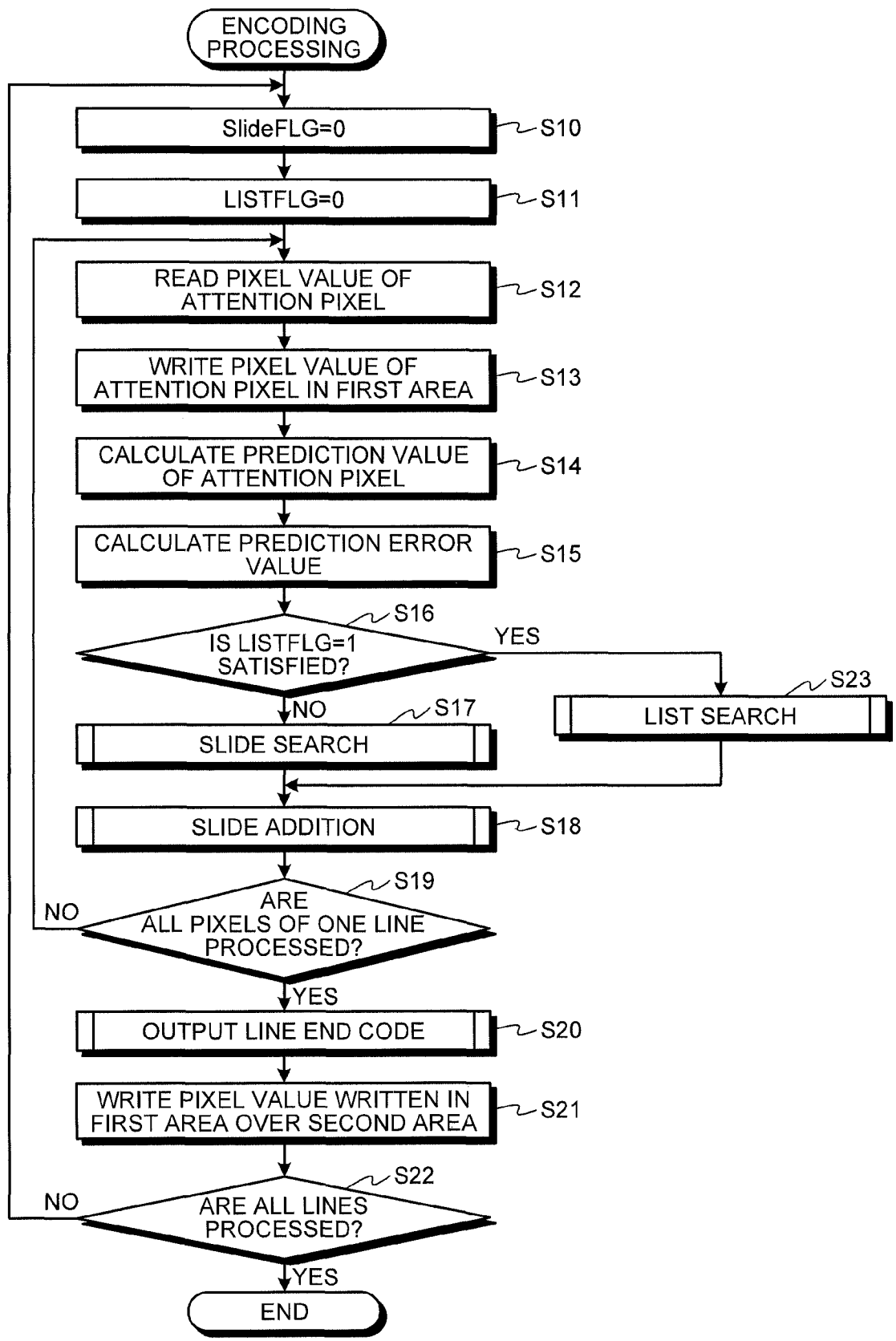
FIG. 10 is an exemplary flowchart illustrating an entire flow of the encoding processing according to the present embodiment.

The encoding processing according to the present embodiment will now be described in greater detail. FIG. 10 is an exemplary flowchart illustrating an entire flow of the encoding processing according to the present embodiment. At first Step S10, the value of the comparison result flag SlideFLAG is initialized to "0". At Step S11, a flag LISTFLG indicating either of which the slide search processing or the list search processing is valid is initialized to "0" indicating the fact that the slide search processing is being performed.

Subsequently, at Step S12, the data reading unit 300 reads the pixel value of one pixel to be encoded (target pixel). At Step S13, the line memory control unit 301 writes the pixel value of the target pixel read by the data reading unit 300 into the first area of the line memory 302. At this time, the second area of the line memory 302 stores therein the pixel values of a plurality of pixels included in a line that is a line immediately before a line including the target pixel, and for which the encoding is already finished. By the control performed by the line memory control unit 301, the pixel value of the target pixel and the pixel values of three surrounding pixels of the target pixel are read from the line memory 302, and are transferred to the prediction processing unit 303.

Subsequently, at Step S14, the prediction processing unit 303 calculates the prediction value of the target pixel (=a+b−c, refer to Equation (1)) based on the pixel values of the three surrounding pixels of the target pixel (the pixel a, the pixel b, and the pixel c described above). The prediction processing unit 303 then transfers the prediction value thus calculated and the pixel value of the target pixel to the prediction error processing unit 304. At Step S15, the prediction error processing unit 304 calculates a prediction error value that is difference between the pixel vale of the target pixel and the prediction value calculated by the prediction processing unit 303. The prediction error processing unit 304 then transfers the prediction error value thus calculated and the target pixel to the slide/list generation processing unit 305.

The process goes to Step S16, and the slide/list generation processing unit 305 determines whether the value of the flag LISTFLG is "1". If the slide/list generation processing unit 305 determines that the value of the flag LISTFLG is not "1", it is determined that the slide search processing is valid at that time, and the process goes to Step S17. At Step S17, the slide/list generation processing unit 305 performs the slide search processing. Details of the slide search processing will be described later.

At Step S18, the input data (prediction error value calculated at Step S15) is added to the slide storage unit. At Step S19, it is determined whether the processing is completed for all the pixels of one line. If it is determined that the processing is not completed yet, the process is returned to Step S12. By contrast, if it is determined that the processing is completed, the process goes to Step S20, and a line end code is output at Step S20. At Step S21, the pixel values of the pixels of one line that are written in the first area, and for which encoding is finished are written over the second area. The process then goes to Step S22, and it is determined whether the processing is completed for all the lines. If it is determined that the processing is completed, the series of encoding processing is terminated. By contrast, if it is determined that the processing is not completed yet, the process is returned to Step S10.

Furthermore, at Step S16, If the slide/list generation processing unit 305 determines that the value of the flag LISTFLG is "1", it is determined that the list search processing is valid at that time, and the process goes to Step S23. At Step S23, the slide/list generation processing unit 305 performs the list search processing. Details of the list search processing will be described later. After the list search processing is performed at Step S23, the process goes to Step S18.

Figure 11:
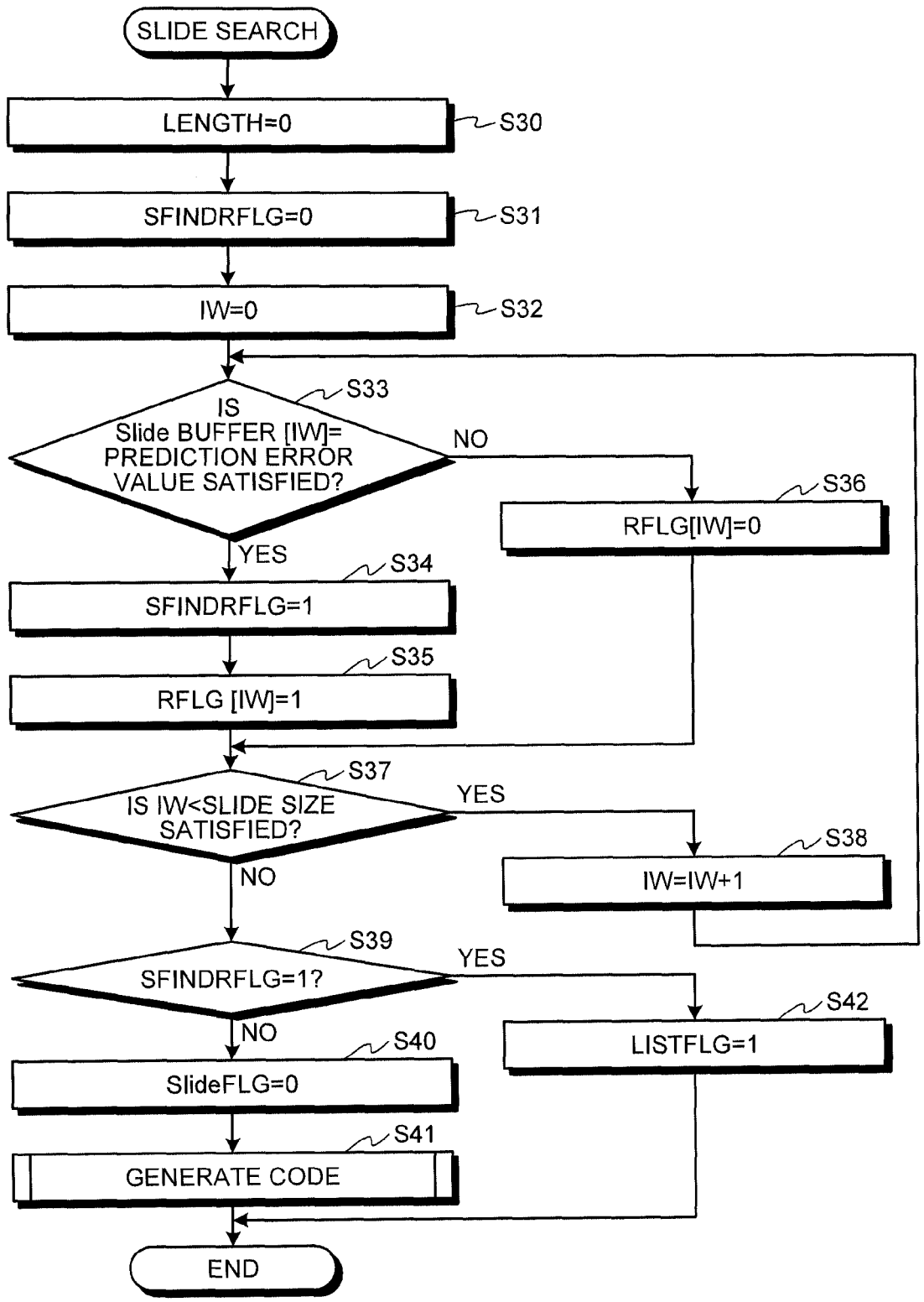
FIG. 11 is a flowchart illustrating an example of detailed contents of the slide search processing.

FIG. 11 is a flowchart illustrating detailed contents of the slide search processing performed at Step S17 of FIG. 10. It is to be noted that the x-th slide (0≤x≤127) in the slide storage unit is hereinafter referred to as a slide [x]. For example, the leading slide in the slide storage unit is represented as a slide [0].

First, from Step S30 to Step S32, the length information Length, a flag SFINDFLG, and a variable IW are initialized to "0". The process goes to Step S33, and it is determined whether previous data stored in a slide [IW] is identical to the input data. If it is determined that the previous data is identical to the input data, the process goes to Step S34, and the value of the flag SFINDFLG is set to "1". Subsequently, at Step S35, the value of the R flag RFLG[IW] is set to "1".

The process then goes to Step S37, and it is determined whether the variable IW is smaller than the slide size, that is, smaller than the number of slides included in the slide storage unit. If it is determined that the variable IW is smaller than the slide size, "1" is added to the variable IW at Step S38, and the process is returned to Step S33. By contrast, if it is determined that the variable IW is equal to or larger than the slide size at Step S37, the process goes to Step S39.

By contrast, if it is determined that the previous data stored in the slide [IW] is not identical to the input data at Step S33, the process goes to Step S36, and the value of the R flag RFLG[IW] is set to "0". Subsequently, the process goes to Step S37.

At Step S39, it is determined whether the value of the flag SFINDFLG is "1". If it is determined that the value of the flag SFINDFLG is not "1", it is assumed that no previous data identical to the input data is stored in the slide storage unit, and the process goes to Step S40. The comparison result flag SlideFLAG is set to "0" at Step S40, and code generation processing is performed at Step S41. Details of the code generation processing will be described later.

By contrast, at Step S39, if it is determined that the value of the flag SFINDFLG is "1", it is assumed that previous data identical to the input data is stored in the slide storage unit.

Subsequently, at Step S42, the value of the flag LISTFLG is set to "1". In other words, the list search processing is determined to be valid.

Figure 12:
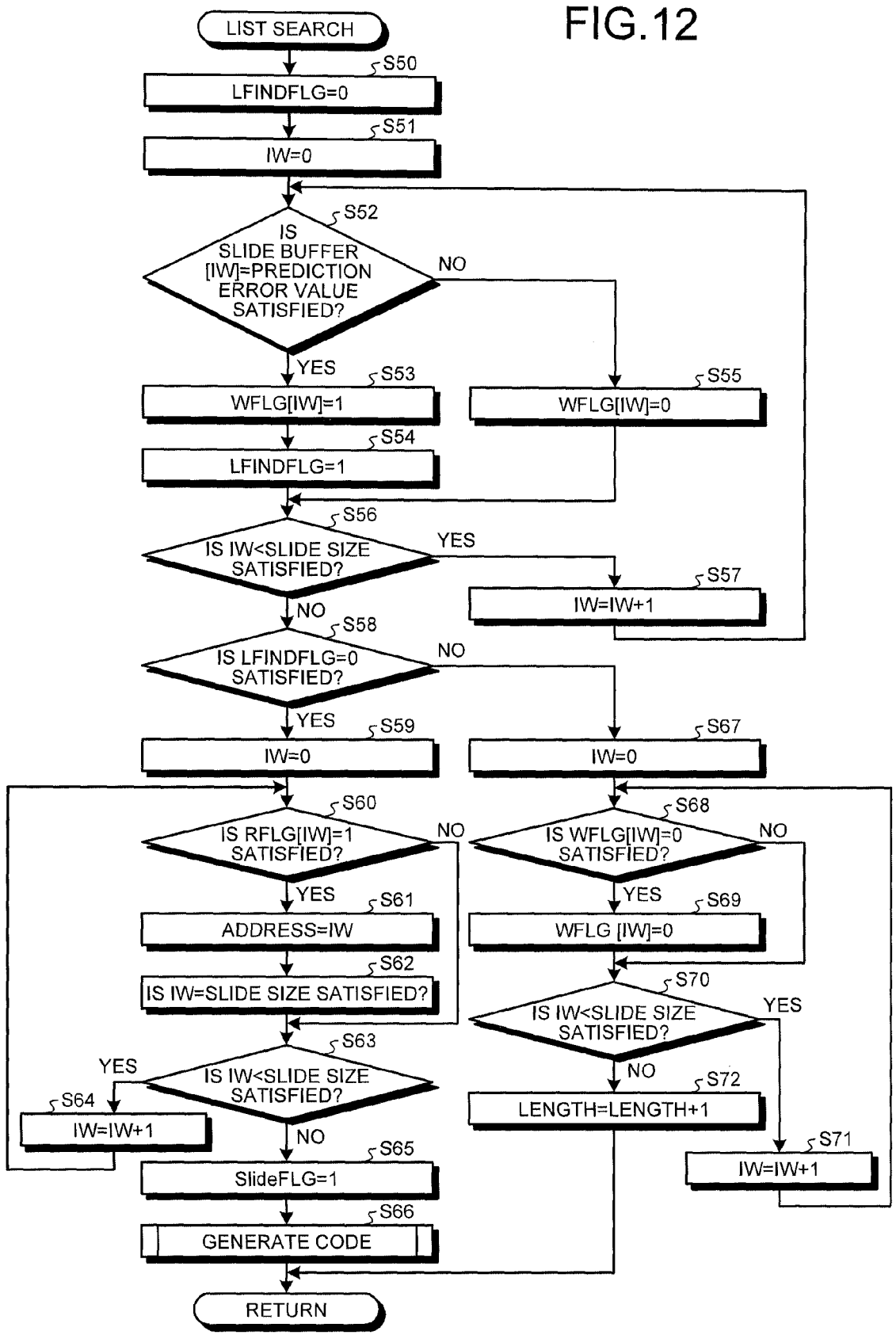
FIG. 12 is a flowchart illustrating an example of detailed contents of the list search processing.

FIG. 12 is a flowchart illustrating detailed contents of the list search processing performed at Step S23 of FIG. 10. First, at Step S50 and Step S51, a flag LFINDFLG and the variable IW are initialized to "0".

At Step S52, it is determined whether previous data stored in the slide [IW] is identical to the input data, and whether the value of the R flag RFLG[IW] is "1". If it is determined that these conditions are satisfied, the process goes to Step S53, and the value of the W flag WFLG[IW] is set to "1". Subsequently, at Step S54, the value of the flag LFINDFLG is set to "1". The process then goes to Step S56.

By contrast, at Step S52, if it is determined that the conditions described above are not satisfied, that is, if it is determined that the previous data stored in the slide [IW] is not identical to the input data, or that the value of the R flag RFLG[IW] is not "1", the process goes to Step S55, and the value of the W flag WFLG[IW] is set to "0". Subsequently, the process goes to Step S56.

At Step S56, it is determined whether the variable IW is smaller than the slide size ("128" in this specification). If it is determined that the variable IW is smaller than the slide size, "1" is added to the variable IW at Step S57, and the process is returned to Step S52. By contrast, if it is determined that the variable IW is equal to or larger than the slide size, the process goes to Step S58.

At Step S58, it is determined whether the value of the flag LFINDFLG is "0". If it is determined that the value is "0", the process goes to Step S59, and the variable IW is initialized to "0". Subsequently, at Step S60, it is determined whether the value of the R flag RFLG[IW] is "1". If it is determined that the value is "1", the process goes to Step S61.

The variable IW is set to the address information Address at Step S61, and the slide size is substituted for the variable IW at Step S62. The process then goes to Step S63. At Step S63, it is determined whether the variable IW is smaller than the slide size. If it is determined that the variable IW is smaller than the slide size, "1" is added to the variable IW at Step S64, and the process is returned to Step S60.

By contrast, if it is determined that the variable IW is equal to or larger than the slide size at Step S63, the process goes to Step S65, and the comparison result flag SlideFLAG is set to "1". The process then goes to Step S66, and the code generation processing is performed. Subsequently, the series of processing is terminated. Details of the code generation processing will be described later.

At Step S58, if it is determined that the value of the flag LFINDFLG is not "0", the process goes to Step S67, and the variable IW is initialized to "0". At Step S68, it is determined whether the value of the W flag WFLG[IW] is "0". If it is determined that the value of the W flag WFLG[IW] is set to "0", the value of the R flag RFLG[IW] is set to "0" at Step S69, and the process goes to Step S70. By contrast, if it is determined that the value of the W flag WFLG[IW] is not "0", the value of the R flag RFLG[IW] is remained without any change, and the process goes to Step S70.

At Step S70, it is determined whether the variable IW is smaller than the slide size. If it is determined that the variable IW is smaller than the slide size, "1" is added to the variable IW at Step S71, and the process is returned to Step S68. By contrast, if it is determined that the variable IW is equal to or larger than the slide size at Step S70, the process goes to Step S72, and "1" is added to the length information Length. Subsequently, the series of processing is terminated.

Figure 13:
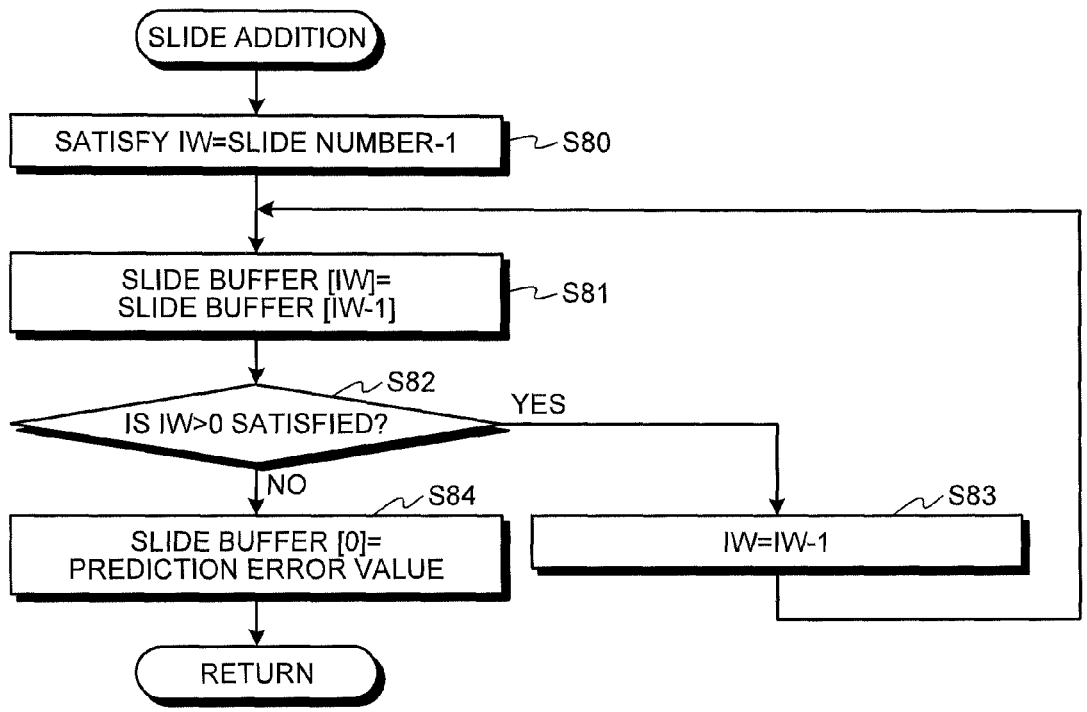
FIG. 13 is a flowchart illustrating an example of detailed contents of the slide addition processing.

FIG. 13 is a flowchart illustrating an example of detailed contents of the slide addition processing performed at Step S18 of FIG. 10. First, at Step S80, the variable IW is set to a value obtained by subtracting 1 from the number of slides. Subsequently, a value of slide [IW−1] is stored in the slide [IW] at Step S81, and it is determined whether the variable IW exceeds "0" at Step S82. If it is determined that the variable IW exceeds "0", the process goes to Step S83, and "1" is subtracted from the variable IW. Subsequently, the process is returned to Step S81. By contrast, at Step S82, if it is determined that the variable IW is equal to or smaller than "0", the process goes to Step S84, and the prediction error value of the input data is stored in a slide [0].

Figure 14:
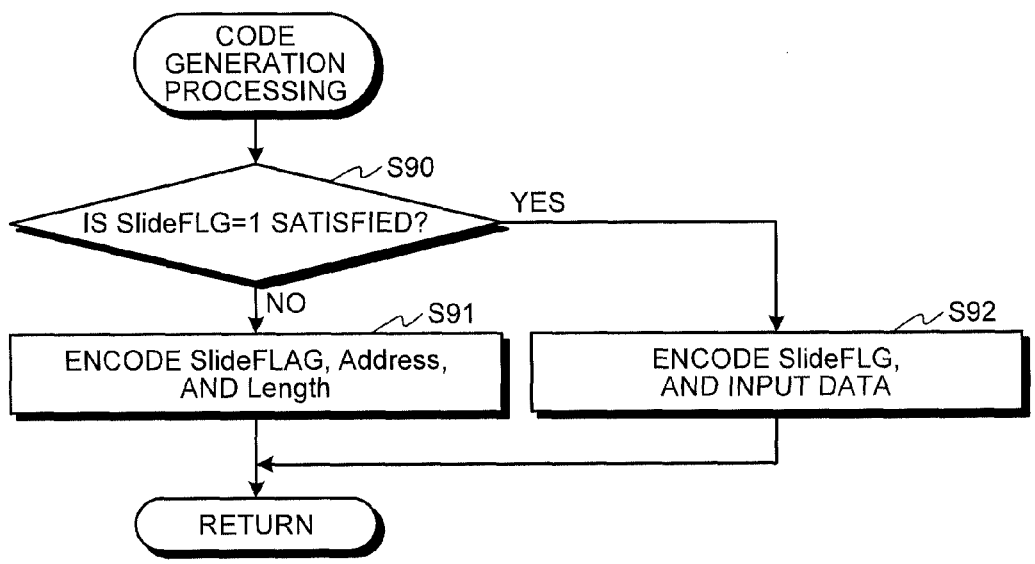
FIG. 14 is a flowchart illustrating an example of detailed contents of code generation processing.

FIG. 14 is a flowchart illustrating an example of detailed contents of the code generation processing performed at Step S41 of FIG. 11 and Step S66 of FIG. 12. First, at Step S90, it is determined whether the value of the comparison result flag SlideFLAG is "1". If it is determined that the value of the comparison result flag SlideFLAG is "1", the process goes to Step S91, and the comparison result flag SlideFLAG, the address information Address, and the length information Length are encoded into the Slide code illustrated in FIG. 6.

By contrast, if it is determined that the value of the comparison result flag SlideFLAG is "0", the process goes to Step S92, and the comparison result flag SlideFLAG, and the input data (prediction- error value) are encoded into the ESC code illustrated in FIG. 6.

Figure 15:
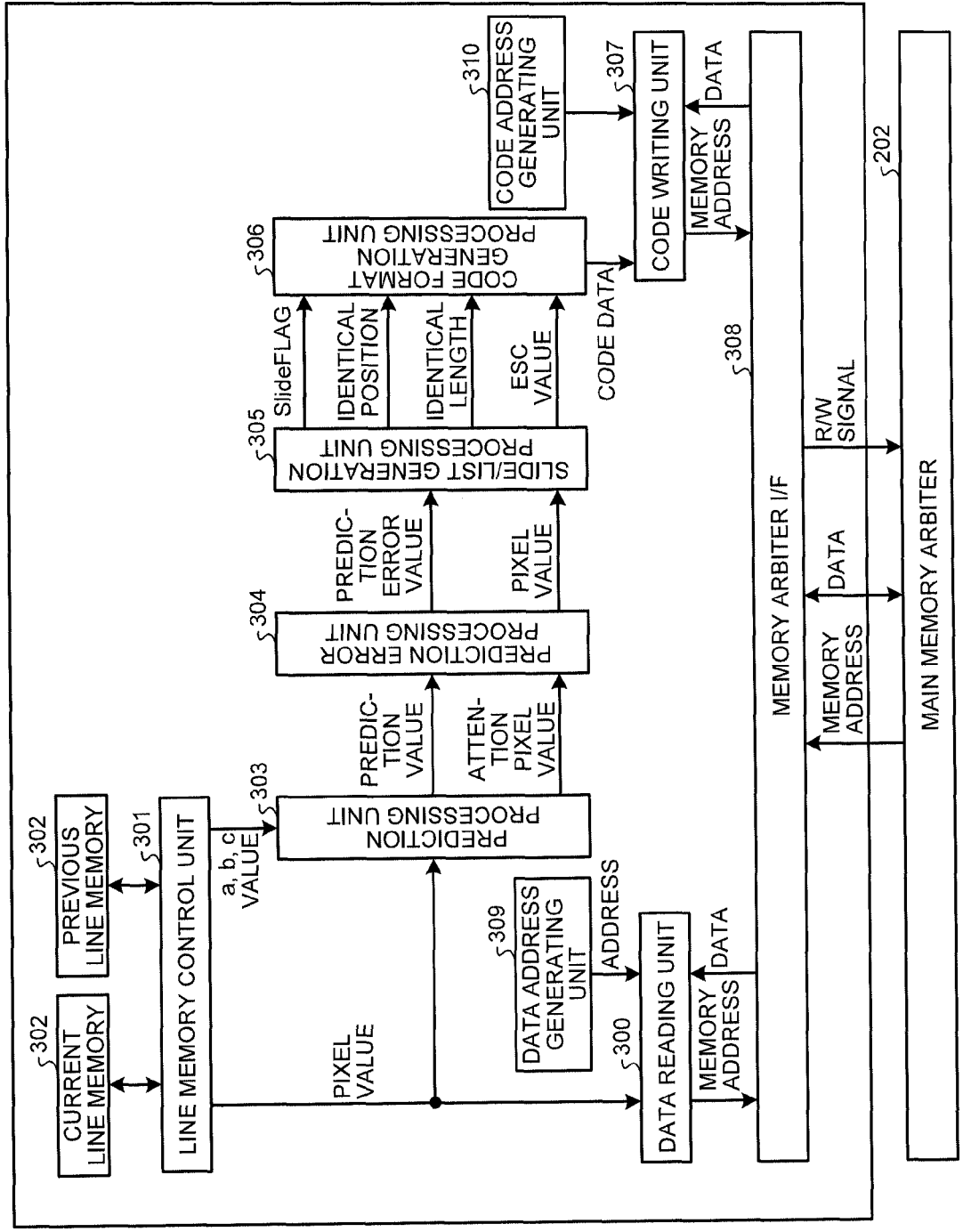
FIG. 15 is a schematic of an exemplary detailed configuration of the encoding unit.

FIG. 15 illustrates an exemplary configuration of the encoding unit 204 in greater detail. In FIG. 15, like numerals are assigned to components in common with those in FIG. 2 and FIG. 3, and detailed explanations thereof will be omitted. The encoding unit 204 includes the data reading unit 300, the line memory control unit 301, the line memory 302, the prediction processing unit 303, the prediction error processing unit 304, the slide/list generation processing unit 305, the code format generation processing unit 306, and the code writing unit 307. In addition, the encoding unit 204 includes a main memory arbiter I/F 308, a data address generating unit 309, and a code address generating unit 310. Note that, in the line memory 302, an area (first area) that stores therein the current line is referred to as a current line memory, and an area (second area) that stores the previous line is referred to as a previous line memory.

The main memory arbiter I/F 308 is an I/F that allows the encoding unit 204 to be connected to the main memory arbiter 202. The data address generating unit 309 generates a memory address used when band image data is read from the CMYK band image data storage area 210C of the main memory 210. The data reading unit 300 requests the main memory arbiter 202 to read the band image data identified by the memory address generated by the data address generating unit 309 via the main memory arbiter I/F 308. The band image data is read from the CMYK band image data storage area 210C of the main memory 210 by the main memory arbiter 202 in response to the request. The band image data is then supplied from the main memory arbiter 202 to the encoding unit 204 and to the data reading unit 300 via the main memory arbiter I/F 308

The code address generating unit 310 generates a memory address into which a code is written by the code writing unit 307 in the CMYK page code storage area 210D of the main memory 210. The code writing unit 307 requests the main memory arbiter 202 to write the code generated by the code format generation processing unit 306 into the CMYK code storage area 210D of the main memory 210 in accordance with the memory address generated by the code address generating unit 310 via the main memory arbiter I/F 308. In response to the request, the main memory arbiter 202 writes the code thus supplied into the main memory 210.

Figure 16:
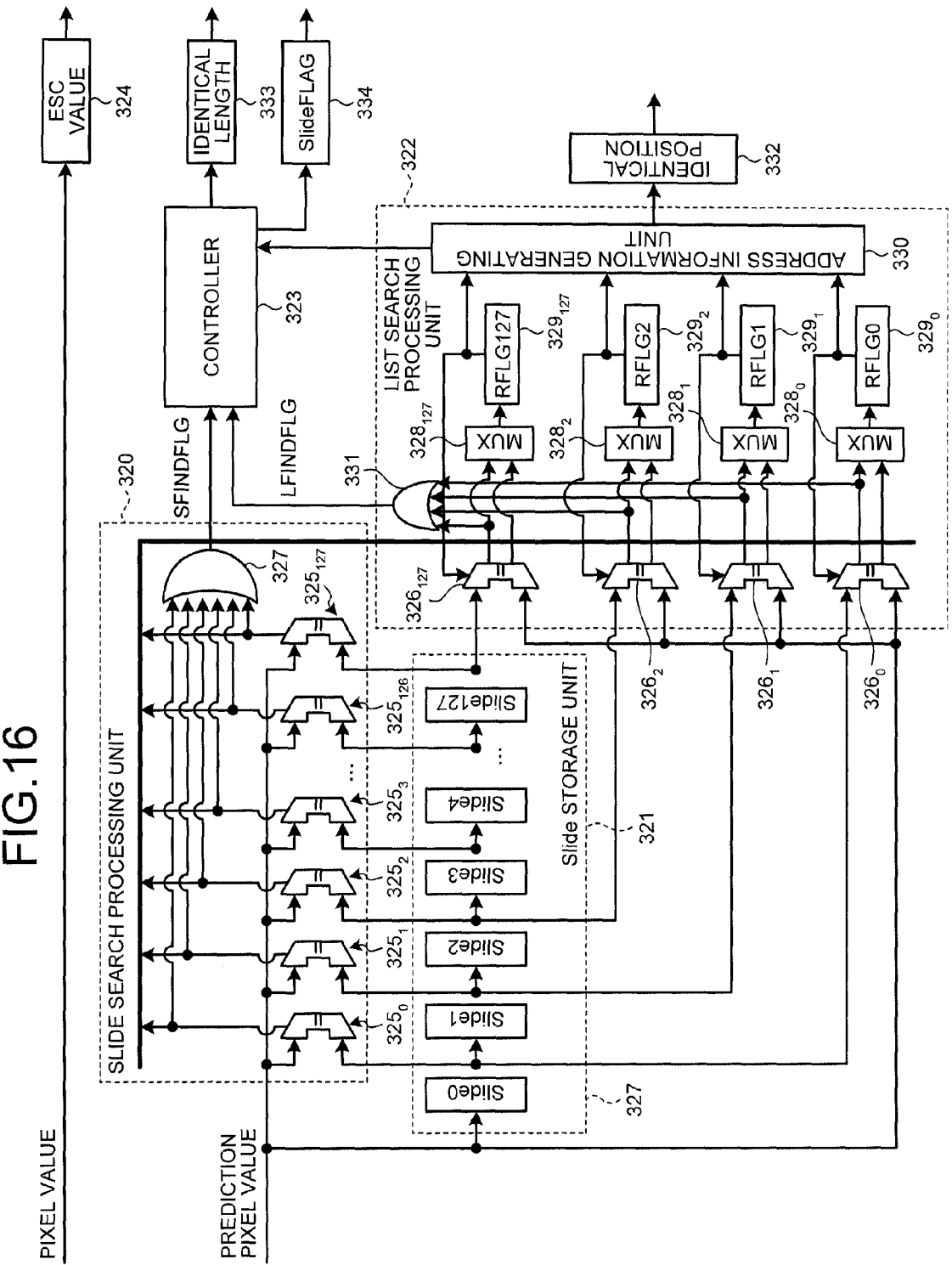
FIG. 16 is a schematic of an exemplary hardware configuration of a slide/list generation processing unit.

Example of the Hardware Configuration of the Slide/List Generation Processing Unit FIG. 16 illustrates an example of the hardware configuration of the slide/list generation processing unit 305 described above. The slide/list generation processing unit 305 includes a slide search processing unit 320, a slide storage unit 321, a list search processing unit 322, and a controller 323.

The controller 323 is formed of a microprocessor, for example, and controls operations of the slide/list generation processing unit 305. The controller 323, for example, performs operation control by the flag LISTFLG indicating either of which the slide search processing or the list search processing is valid.

Input data (prediction error value) in one unit is input to the slide/list generation processing unit 305 for every clock, for example, and is supplied to the slide search processing unit 320, the slide storage unit 321, and the list search processing unit 322. Furthermore, the pixel value of the target pixel used for calculating the prediction error value serving as the input data is stored in a register 324. The pixel value of the target pixel stored in the register 324 is used as a data value when an ESC code is encoded. One unit of the data is one byte in the description below.

The slide storage unit 321 is composed of 128 of Slide0, Slide1, . . . , and Slide127 connected in series, each of which is formed of a register, and each of which stores therein data in one unit. Output from each of Slide0, Slide1, . . . , and Slide127 is supplied to a slide at the next stage. In addition, the output is supplied to one input terminal of a corresponding comparator 325 in the slide search processing unit 320 and to one input terminal of a corresponding comparator 326 in the list search processing unit 322, which will be described later.

In the slide storage unit 321, a FIFO is configured by 128 of Slide0, Slide1, . . . , and Slide127, and input data (prediction error value) is transferred sequentially in order of Slide0, Slide1, Slide2, for every clock.

The slide search processing unit 320 includes 128 comparators of $325_0$, $325_1$, . . . , and $325_{127}$ and an OR circuit 327 receiving 128 input. Each of the comparators of $325_0$, $325_1$, . . . , and $325_{127}$ compares data received by one input terminal and data received by the other. If both pieces of the data are identical to each other, each of the comparators outputs "1", whereas if they are not identical to each other, each of the comparators outputs "0".

As described above, one input terminal of the comparators of $325_0$, $325_1$, . . . , and $325_{127}$ receives output from Slide0, Slide1, . . . , and Slide127 included in the slide storage unit 321, respectively. Furthermore, the other input terminal of the comparators of $325_0$, $325_1$, . . . , and $325_{127}$ receives the input data (prediction error value).

Each output from the comparators of $325_0$, $325_1$, . . . , and $325_{127}$ is received by the OR circuit 327 receiving 128 input. In addition, the output is received by one input terminal of multiplexes (MUXes) $328_0$, $328_1$, . . . , and $328_{127}$ in the list search processing unit 322, which will be described later, respectively. Output from the OR circuit 327 is supplied to the controller 323 as the flag SFINDFLG. The flag SFINDFLG indicates whether at least one of data of Slide0, Slide1, . . . , and Slide127 is identical to the input data.

The list search processing unit 322 includes 128 comparators of $326_0$, $326_1$, . . . , and $326_{127}$, 128 MUXes of $328_1$, $328_2$, . . . , and $328_n$, 128 registers of $329_0$, $329_1$, . . . , and $329_{127}$, an address information generating unit 330, and an OR circuit 331 receiving 128 input. Each of the comparators of $326_0$, $326_1$, . . . , and $326_{127}$ compares data received by one input terminal and data received by the other. If both pieces of the data are identical to each other, each of the comparators outputs "1", whereas if they are not identical to each other, each of the comparators outputs "0".

As described above, one input terminal of the comparators of $326_0$, $326_1$, . . . , and $326_{127}$ receives output from Slide0, Slide1, . . . , and Slide127 included in the slide storage unit 321, respectively. Furthermore, the other input terminal of the comparators of $326_0$, $326_1$, . . . , and $3260_{127}$ receives the input data (prediction error value).

Output from the comparators of $326_0$, $3260_1$, . . . , and $326_{127}$ is the W flag WFLGm. The output is received by the OR circuit 331 receiving 128 input, and by the other input terminal of the MUXes of $328_0$, $328_1$, . . . , and $328_{127}$, respectively. Output from the OR circuit 331 is supplied to the controller 323 as the flag LFINDFLG. The flag LFINDFLG indicates that at least one of the values of W flags of WFLG0, WFLG1, . . . , and WFLG127 is "1".

Output from the MUXes of $328_0$, $328_1$, . . . , and $328_{127}$ is the R flag RFLGm, and is stored in the registers of $329_0$, $329_1$, . . . , and $329_{127}$, respectively. The MUXes of $328_0$, $328_1$, . . . , and $328_{127}$ are controlled by the flag ListFLG supplied from the controller 323 through a path, which is not illustrated, so as to select either of one terminal or the other.

If the value of the flag ListFLG is "0", and it is indicated that the slide search processing is valid at that time, the MUXes of $328_0$, $328_1$, . . . , and $328_{127}$ are controlled so as to supply the output from the comparators of $325_0$, $325_1$, . . . , and $325_{127}$ in the slide search processing unit 320 received by one input terminal thereof to the registers of $329_0$, $329_1$, . . . , and $329_{127}$, respectively.

By contrast, if the value of the flag ListFLG is "1", and it is indicated that the list search processing is valid at that time, the MUXes of $328_0$, $328_1$, . . . , and $328_{127}$ are controlled so as to select the output from the comparators of $326_0$, $326_1$, . . . , and $326_{127}$ in the list search processing unit 322 received by the other input terminal thereof, and to supply the output to the registers of $329_0$, $329_1$, . . . , and $_{329127}$, respectively.

When the output from the MUXes of $328_0$, $328_1$, . . . , and $328_{127}$ is supplied, the registers of $329_0$, $329_1$, . . . , and $329_{127}$ output the R flags of RFLG0, RFLG1, . . . , and RFLG127, respectively, which are stored therein. In other words, the R flags of RFLG0, RFLG1, . . . , and RFLG127 stored in the registers of $329_0$, $329_1$, . . . , and $329_{127}$ are updated by the output from the MUXes of $328_0$, $328_1$, . . . , and $328_{127}$, respectively.

The R flags of RFLG0, RFLG1, . . . , and RFLG127 output from the registers of $329_0$, $329_1$, . . . , and $329_{127}$ are supplied to control terminals of the comparators of $326_0$, $326_1$, . . . , and $326_{127}$ as control signals that control operations of the comparators of $326_0$, $326_1$, . . . , and $326_{127}$, respectively. If the control signal supplied from a corresponding register $329_m$ indicates "1", for example, a comparator $326_m$ performs a comparison operation, whereas, if the control signal indicates "0", the comparator $326_m$ does not perform the comparison operation. This means that operations of the comparators of $326_0$, $326_1$, . . . , and $326_{127}$ are narrowed down by the output from the comparators of $326_0$, $326_1$, . . . , and $326_{127}$ themselves, respectively.

The R flags of RFLG0, RFLG1, . . . , and RFLG127 output from the registers of $329_0$, $329_1$, . . . , and $329_{127}$ are also supplied to the address information generating unit 330. As explained in the processing #5 of FIG. 7, when the list search processing is completed, the address information generating unit 330 selects the R flag RFLGm whose value is "1" among the R flags of RFLG0, RFLG1, . . . , and RFLG127 output from the registers of $329_0$, $329_1$, . . . , and $329_{127}$, and outputs the number of the R flag RFLGm thus selected as the address information Address. The address information Address output from the address information generating unit 330 is stored in a register 332, and is supplied to the controller 323.

If there are a plurality of R flags RFLGm whose value is "1", the address information generating unit 330 preferentially selects the R flag RFLGm based on a slide Slide whose slide number is smaller, that is, a slide Slide closer to the input side in the slide storage unit 321. This is because Slide closer to the input side has a higher possibility to be identical to the input data. At this time, in the code format explained by using FIG. 6, the code format is preferably configured so as to be a shorter code as the address information Address is smaller. With such a configuration, high compression efficiency can be achieved.

The controller 323 generates the length information Length and the comparison result flag SlideFLAG based on the flag SFINDFLG supplied from the slide search processing unit 320, the flag LFINDFLG supplied from the list search processing unit 322, and the address information Address supplied from the address information generating unit 330. The length information Length and the comparison result flag SlideFLAG are stored in a register 333 and a register 334, respectively.

The address information Address, the length information Length, and the comparison result flag SlideFLAG stored in the registers 332 to 334, respectively, are read by the code format generation processing unit 306, and are then encoded in accordance with the code format illustrated in FIG. 6 to generate code data (first code data). Furthermore, the pixel value of the target pixel stored in the register 324 is also read by the code format generation processing unit 306, and is encoded in accordance with the code format illustrated in FIG. 6 to generate code data (second code data).

In such a configuration, the slide search processing is performed as follows. Specifically, the comparators of $325_0$, $325_1$, ..., and $325_{127}$ performs comparison processing between the input data (prediction error value) and the previous input data stored in Slide0, Slide1, ..., and Slide127. Each comparison result is supplied to the OR circuit 327, and the flag SFINDFLG is output therefrom. The comparison result is also supplied to the MUXes of $328_0$, $328_1$, ..., and $328_{127}$, respectively, and is stored in the registers of $329_0$, $329_1$, ..., and $329_{127}$ during the slide search processing. With the configuration illustrated in FIG. 16, the series of processing can be performed in one clock.

Furthermore, the list search processing is performed as follow. The comparators of $326_0$, $326_1$, ..., and $326_{127}$ performs comparison processing between the input data and the previous input data stored in Slide0, Slide1, ..., and Slide127. At this time, the comparison operations performed by the comparators of $326_0$, $326_1$, ..., and $326_{127}$ are controlled based on the values of the R flags of RFLG0, RFLG1, ..., and RFLG127 stored in the registers of $329_0$, $329_1$, ..., and $329_{127}$. If all the values of the R flags of RFLG0, RFLG1, ..., and RFLG127 are "0", all the comparators of $326_0$, $326_1$, ..., and $326_{127}$ do not perform the comparison operation. This state is referred to as a state where the list search processing is not being performed.

Each comparison result of the comparators of $326_0$, $326_1$, ..., and $326_{127}$ is supplied to the OR circuit 331, and the flag LFINDFLG is output therefrom. The comparison result is also supplied to the MUXes of $328_0$, $328_1$, ..., and $328_{127}$, respectively, and is stored in the registers of $329_0$, $329_1$, ..., and $329_{127}$ during the list search processing. Furthermore, the R flags of RFLG0, RFLG1, ..., and RFLG127 stored in the registers of $329_0$, $329_1$, ..., and $329_{127}$ are also retained in the address information generating unit 330.

If all the values stored in the registers of $329_0$, $329_1$, ..., and $329_{127}$ are "0", the address information generating unit 330 transfers the position of the R flag RFLGm whose value is "1" among the R flags of RFLG0, RFLG1, ..., and RFLG127 thus retained to the controller 323 as the address information Address. With the configuration illustrated in FIG. 16, the series of processing in the list search processing can be performed in one clock.

With the configuration illustrated in FIG. 16, the slide search processing unit 320 and the list search processing unit 322 are configured separately, and the slide storage unit 321 is shared by the slide search processing unit 320 and the list search processing unit 322. Therefore, it is possible to perform the slide search processing by the slide search processing unit 320 and the list search processing by the list search processing unit 322 in a parallel manner. Accordingly, the encoding processing can be performed at higher speed. Furthermore, with the configuration illustrated in FIG. 16, configurations such as a read-ahead buffer and large-scale matrix array are not required. Accordingly, the scale of the hardware configuration can be made small.

Decoding Unit

Figure 17:
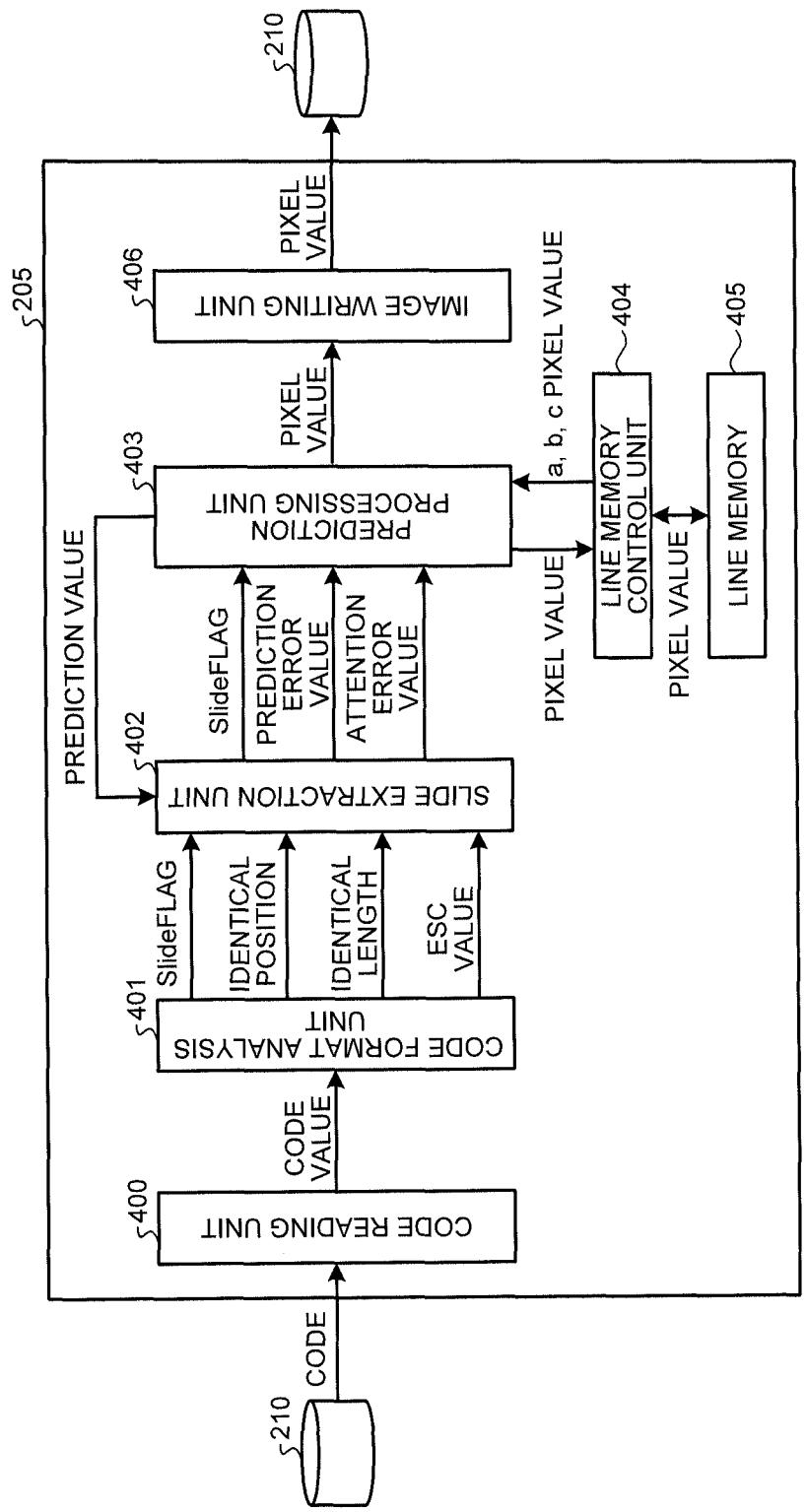
FIG. 17 is a schematic of an exemplary configuration of a decoding unit.

FIG. 17 illustrates an exemplary configuration of the decoding unit 205. In the decoding unit 205, a code reading unit 400 reads the code data encoded by the encoding unit 204 described above from the CMYK page code storage area 210D of the main memory 210. The code data read by the code reading unit 400 is supplied to a code format analysis unit 401. The code format analysis unit 401 analyzes the code data thus supplied in accordance with the code format explained by using FIG. 6, and acquires the pixel value of the target pixel, the address information Address, the length information Length, and the comparison result flag Slide-FLAG. These pieces of data thus achieved are supplied to a slide extraction unit 402.

The slide extraction unit 402 includes a slide storage unit in which a plurality of registers connected in series are configured as a FIFO. Each register is referred to as a slide, and can store therein data in one unit (e.g., one byte). If the comparison result SlideFLG transferred from the code format analysis unit 401 is "1", the slide extraction unit 402 reads the prediction error value stored in the register identified by the address information Address among the registers, and transfers the prediction error value thus read and the comparison result flag SlideFLAG set to "1" to a prediction processing unit 403. By contrast, if the comparison result SlideFLG transferred from the code format analysis unit 401 is "0", the slide extraction unit 402 transfers the pixel value of the target pixel transferred from the code format analysis unit 401 and the comparison result flag SlideFLAG set to "0" to the prediction processing unit 403.

If the comparison result flag SlideFLAG set to "1" and the prediction error value are transferred from the slide extraction unit 402, the prediction processing unit 403 calculates the prediction value of the pixel value of a target pixel based on the pixel values of already decoded pixels a, b, and c (refer to FIG. 4) of three surrounding pixels of the pixel to be decoded (target pixel) read from a line memory 405 by a line memory control unit 404. The prediction processing unit 403 then calculates the pixel value of the target pixel from the prediction value thus calculated and the prediction pixel value transferred from the slide extraction unit 402, and transfers the pixel value of the target pixel thus calculated to an image writing unit 406 and the line memory control unit 404.

The line memory 405 can store therein pixel values for two lines of a line being decoded on which decoding is being performed and an already decoded line for which decoding is finished just previously. In the line memory 405, an area that stores therein the line being decoded is referred to as a current line memory, and an area that stores therein the already decoded line is referred to as a previous line memory. The line memory control unit 404 controls read and write of pixel values from and to the line memory 405.

By contrast, if the comparison result flag SlideFLAG set to "0" and the pixel value of the target pixel are transferred from the slide extraction unit 402, the prediction processing unit 403 transfers the pixel value of the target pixel thus transferred to the image writing unit 406 and the line memory control unit 404. Furthermore, based on the pixel values of the already decoded pixels a, b, and c (refer to FIG. 4) of the three surrounding pixels of the pixel to be decoded (target pixel) read from the line memory 405 by the line memory control unit 404, the prediction processing unit 403 calculates the prediction value of the pixel value of the target pixel. The prediction processing unit 403 then calculates the prediction error value from the prediction value thus calculated and the pixel value of the target pixel transferred from the slide extraction unit 402, and transfers the prediction error value thus calculated to the slide extraction unit 402. The slide extraction unit 402 adds the prediction error value transferred from the prediction processing unit 403 to the slide storage unit.

The image writing unit 406 writes the pixel value of the target pixel transferred from the prediction processing unit 403 into the CMYK band image data storage area 210C of the main memory 210.

Details of the Decoding Processing

Figure 18:
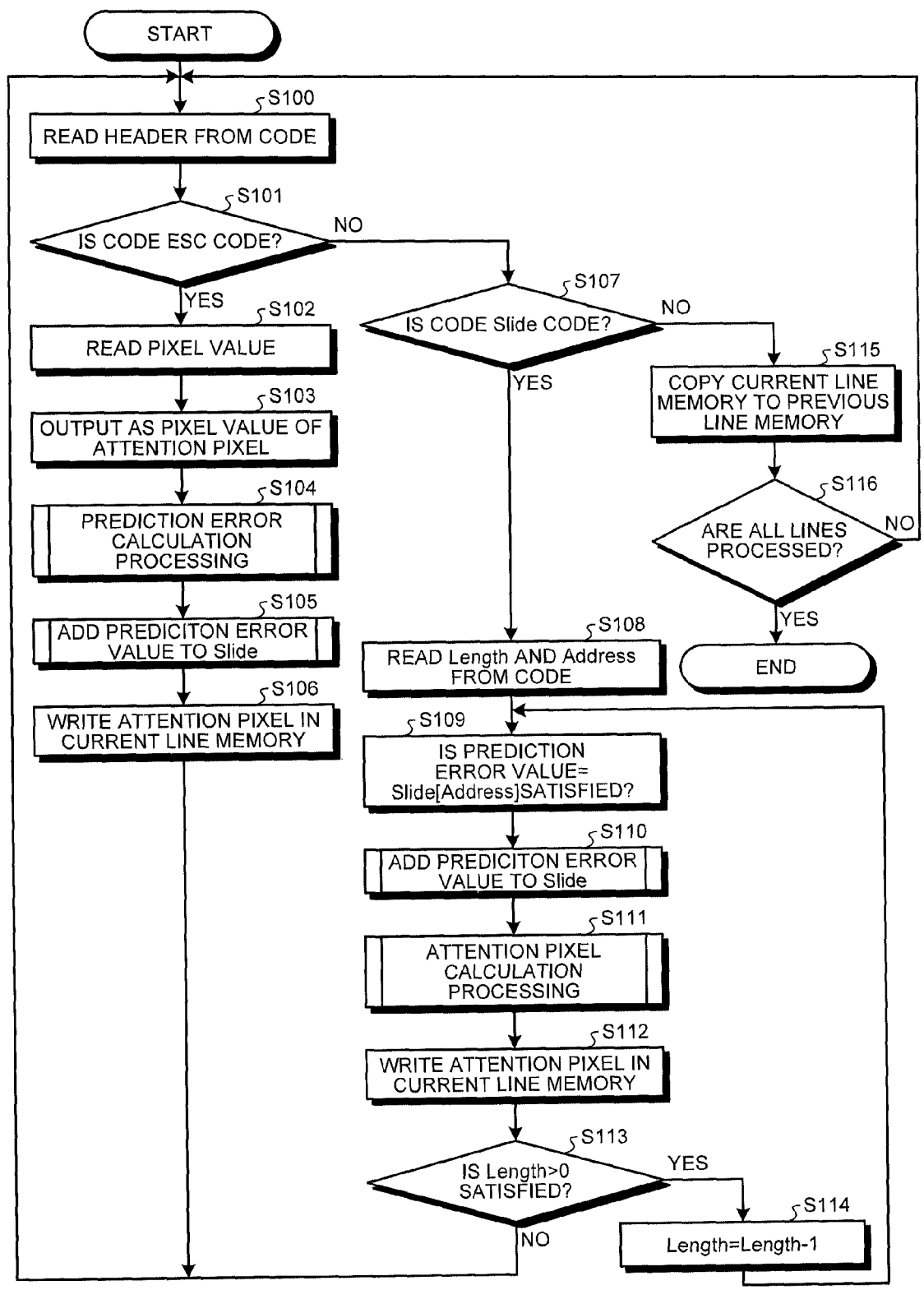
FIG. 18 is a flowchart illustrating an example of decoding processing.

FIG. 18 is a flowchart illustrating an example of processing performed by the decoding unit 205 for decoding the code data encoded by the encoding method according to the present embodiment. The code data is assumed to be read from the main memory 210 by the code reading unit 400 in advance. First, at Step S100, the code format analysis unit 401 reads the header of the code data read by the code reading unit 400. The code format analysis unit 401 then determines whether a code subsequent thereto is an ESC code (Step S101).

If the code is determined to be an ESC code based on the header thus read, the process goes to Step S102. At Step S102, the code format analysis unit 401 reads bits of a predetermined length subsequent to the header as a pixel value. The pixel value thus read is output as the pixel value of the target pixel without any change (Step S103), and the prediction error value of the target pixel is calculated (Step S104). Subsequently, the prediction error value thus calculated is added to the slide storage unit (Step S105). The addition processing of the prediction error value thus calculated to the slide storage unit is performed by the same process as that explained in the flowchart of FIG. 13. The process goes to Step S106. At Step S106, the pixel value of the target pixel is written into the current line memory of the line memory 405.

At Step S101, if the code is determined not to be an ESC code based on the header thus read, it is determined whether the code is a Slide code (Step S107). At Step S107, if it is determined that the code is a Slide code, the process goes to Step S108. At Step S108, the code format analysis unit 401 reads bits of a predetermined length subsequent to the header as the length information Length and the address information Address. The length information Length and the address information Address thus read are supplied to the slide extraction unit 402 together with the comparison result flag SlideFLAG.

Subsequently, at Step S109, the slide extraction unit 402 reads data (prediction error value) stored in a slide indicated by the address information Address among the slides in the slide storage unit. The slide extraction unit 402 then adds the data thus read to the slides (Step S110), and calculates the pixel value of the target pixel based on the data thus read (Step S111). The pixel value of the target pixel thus calculated is transferred to the image writing unit 406 and the line memory control unit 404. The line memory control unit 404 then writes the pixel value of the target pixel into the current line memory of the line memory 405 (Step S112).

The process then goes to Step S113, and it is determined whether the length information Length is larger than "0". If it is determined that the length information Length is equal to or smaller than "0", the process is returned to Step S100. By contrast, if it is determined that the length information Length is larger than "0", the process goes to Step S114. At Step S114, a value obtained by subtracting 1 from the current length information Length is determined to be new length information Length. Subsequently, the process is returned to Step S109.

If it is determined that the code is not a Slide code at Step S107, the code data thus read is determined to be a line end code, and the process goes to Step S115. At Step S115, the line memory control unit 404 writes the data of the current line memory over the previous line memory. The process then goes to Step S116, and it is determined whether the decoding processing for all the lines is completed. If it is determined that the decoding processing for all the lines is completed, the series of processing is terminated. By contrast, if it is determined that the decoding processing for all the lines is not completed yet, the process is returned to Step S100.

Figure 19:
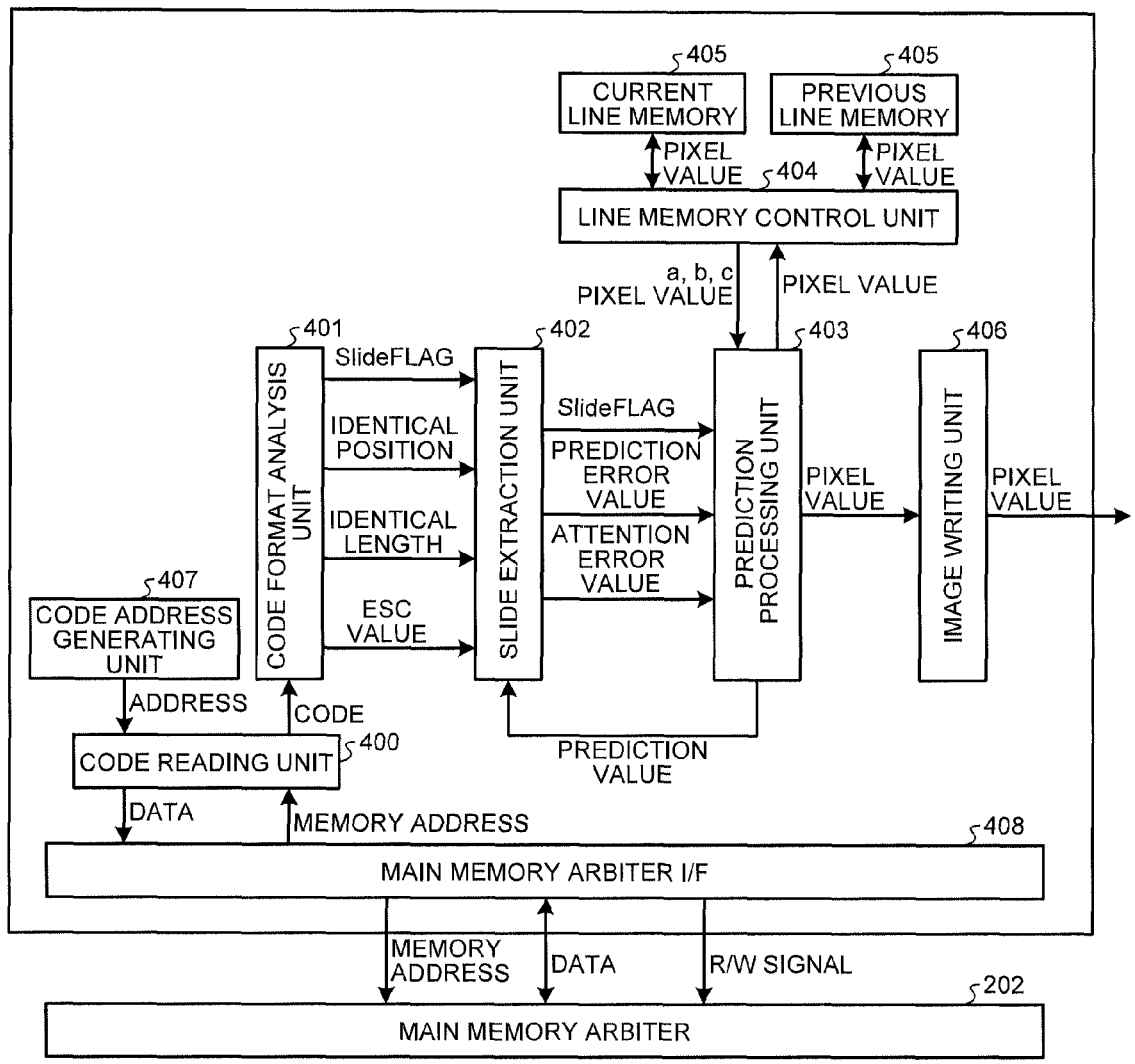
FIG. 19 is a schematic of an exemplary detailed configuration of the decoding unit.

FIG. 19 illustrates an exemplary configuration of the decoding unit 205 in greater detail. In FIG. 19, like numerals are assigned to components in common with those in FIG. 2 and FIG. 17, and detailed explanations thereof will be omitted. The decoding unit 205 includes the code reading unit 400, the code format analysis unit 401, the slide extraction unit 402, the prediction processing unit 403, the line memory control unit 404, the line memory 405, and the image writing unit 406. In addition, the decoding unit 205 includes a main memory arbiter I/F 408 and a code address generating unit 407.

The main memory arbiter I/F 408 is an I/F that allows the decoding unit 205 to be connected to the main memory arbiter 202. The main memory arbiter I/F 408 transmits a read/write request (R/W signal) and a memory address to the main memory arbiter 202, thereby writing data to the main memory 210, and reading data from the main memory 210.

The code address generating unit 407 generates a memory address used when code data is read from the CMYK page code storage area 210D of the main memory 210. The code reading unit 400 requests the main memory arbiter 202 to read the code data identified by the memory address generated by the code address generating unit 407 via the main memory arbiter I/F 408. The code data is read from the CMYK page code storage area 210D of the main memory 210 by the main memory arbiter 202 in response to the request. The code data is then supplied to the code reading unit 400 via the main memory arbiter I/F 408.

Hardware Configuration of the Slide Extraction Unit

FIG. 20 illustrates an exemplary hardware configuration of the slide extraction unit 402. The slide extraction unit 402 includes a prediction error generating unit 490, a slide storage unit 500, a controller 501, and MUXes 502 and 503.

The controller 501 is formed of a microprocessor, for example. The controller 501 is supplied with the address information Address, the length information Length, and the comparison result flag SlideFLAG, and controls the entire operation of the slide extraction unit 402 based on the data thus supplied. The controller 501, for example, controls the addition processing of a data value to the slides in the slide storage unit 500 and operations of the MUXes 502 and 503.

The slide storage unit 500 includes a FIFO composed of 128 slides of $511_0$, $511_1$, ..., and $511_{127}$ connected in series, each of which is formed of a register, and each of which stores therein data in one unit, and an MUX 510 connected to the beginning of the FIFO.

Output from each of the slides of $511_0$, $511_1$, ..., and $511_{127}$ is supplied to the MUX 502. Output from the MUX 502 is supplied to the MUX 503 and the MUX 510.

The prediction error generating unit 490 generates the prediction error value from the pixel value of the target pixel supplied from the code format analysis unit 401 described above and the prediction value supplied from the prediction processing unit 403 described above. The prediction error value generated by the prediction error generating unit 490 is supplied to the MUX 510 and the MUX 503.

During the processing at Step S109 in FIG. 18, the MUX 502 selects the data value stored in a slide $511_{Address}$ from the data values (prediction error values) stored in the slides of $511_0$, $511_1$, ..., and $511_{127}$ in the slide storage unit 500 in accordance with the address information Address supplied from the controller 501. The MUX 502 then supplies the data value thus selected to the MUXes 503 and 510.

After the processing at Step S109 in FIG. 18, the MUX 503 outputs the data value supplied from the MUX 502. Furthermore, after the processing at Step S104 in FIG. 18, the MUX 503 outputs the data value supplied from the prediction error generating unit 490. During the slide addition processing at Step S105 in FIG. 18, the MUX 510 adds the prediction error value supplied from the prediction error generating unit 490 to the slide $511_0$. By contrast, during the slide addition processing at Step S110 in FIG. 18, the MUX 510 adds the prediction error value supplied from the MUX 502 to the slide $511_0$.

Advantageous Effects

As described above, according to the present embodiment, in the encoding processing, if an input prediction error value is identical to none of prediction error values that have been already stored in the slide storage unit, the pixel value of a target pixel in which the input prediction error value is calculated is encoded. As a result, it is possible to reduce the number of bits required for encoding compared with a configuration in which the input prediction error value itself is encoded. Accordingly, there is an advantageous effect in that the compression ratio can be improved.

The explanation has been made of the case where the embodiment is applied to the printer. However, it is just an example, and the present invention is not limited thereto. In other words, the present invention is applicable to other apparatuses that perform lossless encoding of data by using hardware.

According to the embodiment, in the encoding processing, if an input prediction error value is identical to none of prediction error values that have been already stored in the slide storage unit, the pixel value of a target pixel in which the input prediction error value is calculated is encoded. As a result, it is possible to reduce the number of bits required for encoding compared with a configuration in which the prediction error value is encoded. Accordingly, the embodiment provides an advantageous effect in that the compression ratio can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a first storage unit into which each pixel value of a plurality of pixels that constitute image data is written;
    a first reading unit that reads a pixel value of a target pixel to be encoded and a pixel value of a surrounding pixel of the target pixel from the first storage unit;
    a first prediction value calculating unit that calculates a prediction value of the pixel value of the target pixel based on the pixel value of the surrounding pixel read by the first reading unit;
    a prediction error calculating unit that calculates a prediction error that is difference between the prediction value calculated by the first prediction value calculating unit and the pixel value of the target pixel;
    a second storage unit configured to,
        sequentially receive the prediction error calculated by the prediction error calculating unit from a first terminal as a received prediction error,
        store therein the received prediction error consecutively as stored prediction errors, the stored prediction errors being previously received prediction errors, and
        transfer the stored prediction errors to a second terminal;
    a comparing unit that compares the received prediction error with each of the stored prediction errors;
    a search unit that, when the received prediction error is identical to each of the stored prediction errors as a result of comparison made by the comparing unit, searches for a data array that is composed of the stored prediction error that is stored consecutively and that is identical to an input data array composed of the received prediction error that is received sequentially;
    a length information generating unit that generates length information indicating a length of the data array searched for by the search unit;
    an address information generating unit that generates address information indicating a position in the second storage unit at which start data of the data array searched for by the search unit is stored;
    a first code data generating unit that generates first code data obtained by encoding the length information generated by the length information generating unit and the address information generated by the address information generating unit; and
    a second code data generating unit that, when the received prediction error is identical to none of the stored prediction errors as a result of the comparison made by the comparing unit, generates second code data obtained by encoding the pixel value of the target pixel from which the received prediction error is calculated.

2. The image processing apparatus according to claim 1, wherein
the first storage unit comprises:
    a first area capable of storing therein pixel values for one line, and into which the pixel value of the target pixel is written sequentially; and a second area that stores therein each pixel value of a plurality of pixels included in a line that is a line immediately before a line including the target pixel, and for which encoding is already finished; and the image processing apparatus further comprises an overwriting unit that, when encoding of the pixel values for one line written in the first area is finished, writes the pixel values for the one line for which the encoding is finished over the second area.

3. The image processing apparatus according to claim 1, further comprising:

a third storage unit that stores therein the first code data generated by the first code data generating unit and the second code data generated by the second code data generating unit;

a second reading unit that reads out data stored in the third storage unit;

a determination unit that determines whether the data read out by the second reading unit is the first code data or the second code data;

a first specifying unit that, when the data is the first code data as a result of determination made by the determination unit, specifies the length information and the address information from the first code data;

a second specifying unit that specifies the prediction error of the pixel to be decoded by using the length information and the address information specified by the first specifying unit;

a fourth storage unit that stores therein a pixel value of the pixel for which decoding is already finished;

a second prediction value calculating unit that reads out a pixel value of a surrounding pixel of the pixel to be decoded from the fourth storage unit, and calculates a prediction value of a pixel value of the pixel to be decoded based on the pixel value of the surrounding pixel thus read;

a first decoding unit that obtains the pixel value of the pixel to be decoded from the prediction error of the pixel to be decoded and the prediction value calculated by the second prediction value calculating unit, and decodes the pixel value; and a second decoding unit that, when the data is the second code data as a result of the determination made by the determination unit, obtains a pixel value specified by the second code data, and decodes the pixel value.

4. An image processing method comprising:

reading a pixel value of a target pixel to be encoded and a pixel value of a surrounding pixel of the target pixel from a first storage unit into which each pixel value of a plurality of pixels that constitute image data is written;

first calculating that includes calculating a prediction value of the pixel value of the target pixel based on the pixel value of the surrounding pixel read at the reading;

second calculating that includes calculating a prediction error that is a difference between the prediction value calculated at the first calculating of a prediction value and the pixel value of the target pixel and sending the calculated prediction error to a second storage unit;

sequentially receiving the calculated prediction error as a received prediction error;

storing, in the second storage unit, the received prediction errors consecutively as stored prediction errors, the stored prediction errors being previously received prediction errors;

comparing the received prediction error with each of the stored prediction errors;

searching for, when the received prediction error is identical to each of the stored prediction errors as a result of comparison at the comparing, a data array that is composed of the stored prediction error that is stored consecutively and that is identical to an input data array composed of the received prediction error that is received sequentially;

generating length information indicating the length of the data array searched for at the searching;

generating address information indicating a position in the second storage unit at which start data of the data array searched for at the searching is stored;

generating first code data obtained by encoding the length information generated at the generating of length information and the address information generated by the address information generating unit; and generating, when the received prediction error is identical to none of the stored prediction errors as a result of the comparison at the comparing, second code data obtained by encoding the pixel value of the target pixel in which the received prediction error is calculated.

* * * * *